US007146343B2

(12) United States Patent
Donahue

(10) Patent No.: US 7,146,343 B2
(45) Date of Patent: Dec. 5, 2006

(54) METHOD AND APPARATUS FOR NEGOTIATING A CONTRACT OVER A COMPUTER NETWORK

(75) Inventor: John J. Donahue, Melrose, MA (US)

(73) Assignee: J. J. Donahue & Company, Boston, MA (US)

( * ) Notice: Subject to any disclaimer, the term of this patent is extended or adjusted under 35 U.S.C. 154(b) by 790 days.

(21) Appl. No.: 10/042,245

(22) Filed: Jan. 11, 2002

(65) Prior Publication Data

US 2002/0095311 A1 Jul. 18, 2002

Related U.S. Application Data

(63) Continuation-in-part of application No. 09/610,005, filed on Jul. 5, 2000.

(51) Int. Cl.
G06Q 99/00 (2006.01)

(52) U.S. Cl. .................. 705/80; 707/104.1; 707/203; 707/204; 707/205; 707/10; 707/200; 707/3; 709/203; 709/219; 709/217; 709/231; 713/176; 386/126

(58) Field of Classification Search .................. 705/80; 707/104.1, 203, 204, 205, 10, 200, 3; 709/203, 709/219, 217, 231; 713/176; 386/126
See application file for complete search history.

(56) References Cited

U.S. PATENT DOCUMENTS

| 5,875,431 | A | 2/1999 | Heckman et al. | |
|---|---|---|---|---|
| 5,999,908 | A | 12/1999 | Abelow | |
| 6,141,653 | A | 10/2000 | Conklin et al. | |
| 6,502,113 | B1 | 12/2002 | Crawford et al. | |
| 6,784,901 | B1 * | 8/2004 | Harvey et al. | 715/757 |
| 2001/0005829 | A1 * | 6/2001 | Raveis, Jr. | 705/1 |
| 2002/0046159 | A1 * | 4/2002 | Raveis, Jr. | 705/38 |

(Continued)

FOREIGN PATENT DOCUMENTS

JP 2001350848 A * 12/2001

(Continued)

OTHER PUBLICATIONS

Gleick, James. "Click to Agree." http://www.around.com/agree.html. Retreived online May 19, 2006.*

(Continued)

Primary Examiner—James A. Reagan
(74) Attorney, Agent, or Firm—Banner & Witcoff, Ltd.

(57) ABSTRACT

The invention provides a system and method that facilitates a structured contract negotiation between two parties, such as parties to a real estate transaction. A series of predefined milestone negotiation steps are executed on a computer that couples two parties through a network, such as the Internet. The negotiators answer predefined questions regarding a proposed transaction in such a manner that certain aspects of the transaction can be agreed upon early during the negotiation process while others are deferred to later phases. In each phase, each party selects from a predefined list of actions associated with a particular aspect of the negotiation (e.g., sale price). Third-party service providers such as brokers and architects can be automatically pulled into the negotiations using computer-issued requests for services. Feedback from the parties in the form of problems encountered and solutions achieved during the negotiation process are collected and stored in a database for review and use by other future negotiation parties. Improvements to the disclosed invention include (1) rules-based agreement on negotiator-supplied terms; (2) delegation to transaction team members or service providers; (3) summary reports with link to messaging system; (4) a dual messaging system; (5) customized negotiation process; and (6) sale-specific features.

17 Claims, 41 Drawing Sheets

U.S. PATENT DOCUMENTS

| | | | |
|---|---|---|---|
| 2002/0049624 A1* | 4/2002 | Raveis, Jr. | 705/8 |
| 2002/0052814 A1 | 5/2002 | Ketterer | |
| 2002/0065739 A1 | 5/2002 | Florance et al. | |

FOREIGN PATENT DOCUMENTS

| | | |
|---|---|---|
| JP | 2002-7542 | 1/2002 |
| WO | WO 98/58338 | 6/1998 |

OTHER PUBLICATIONS www.loopnet.com, Information printed from website on Apr. 3, 2001: Homepage, Search properties, and Property matching services, 10 pages.

www.propertyfirst.com, Information printed from website on Apr. 3, 2001: Homepage, Search properties, and Broker directory, 8 pages.

www.egpropertylink.com, Information printed from website on Apr. 3, 2001: Homepage, Smart search and Investment search, 5 pages.

* cited by examiner

| Decision | Tenant | Response & Dialogue Box | | Landlord | |
|---|---|---|---|---|---|
| How much space is to be leased? | Agree ▼ 1308 1357 | Note: The parties should indicate if known the actual or estimated amount of space in square feet or square meters, or indicate in the dialogue box if another measure would be used. If the exact amount of space is not known, the parties should refer to another description such as a particular floor or an amount of space as referred to in a particular plan. | | Agree ▼ 1310 1309 | Details |
| | | accept [m² ▼] | 5000 [ft² ▼] | | |
| | | 1356 accept | We assume that the space measurements exclude closet space. | 1350 | |
| Is there a plan that indicates the space to be leased? | Defer ▼ 1353 | Note: There should be a reference to a plan of the space. This plan is normally provided by the landlord. If there is no plan, the parties should refer in the dialogue box to the floor and building upon which the space is located. 1352 | | Agree ▼ | Details |
| | | ● Yes ○ No | ● Yes ○ No | | |
| | | | Plan number 14577A, dated June 1, 2001, will control | 1351 | |
| Is the tenant leasing all or a portion of the space? | Agree ▼ | Note: Please indicate whether the tenant is leasing all of a floor, a partial floor, or some other portion of the premises. | | Agree ▼ | Details |
| | | ○ Lease All Space on Floor | ○ Lease All Space on Floor | | |
| | | ● Lease Portion of Space | ● Lease Portion of Space | | |
| | | ○ Other | ○ Other | | |
| | | | | | |
| Have the parties agreed on the tenant's proposed occupancy date? | Agree ▼ | Note: This is the date when the tenant plans to move into the leased premises. At this point, this date is an objective, and not a commitment on the part of either party to meet this date. A more detailed schedule will be agreed in Step 7 of this phase. | | Agree ▼ | Details |
| | | ● Yes Specify below | ● Yes Specify below | | |
| | | ○ No- to be agreed | ○ No- to be agreed | | |
| | | 1354 December 1, 2001 | December 1, 2001 | 1355 | |

FIG. 13A

| DETAILS: LANDLORD'S WORKS (PHASE I) | | | |
|---|---|---|---|
| DECISION | TENANT | VALUE | LANDLORD |
| 1. DELIVER ON "TURNKEY" BASIS? | ○ AGREE<br>○ DEFER | | ○ AGREE<br>○ DEFER |
| 2. DELIVER IN "AS-IS" CONDITION? | ● AGREE<br>○ DEFER | | ● AGREE<br>○ DEFER |
| 3. AGREED DEFINITION OF LANDLORD'S WORKS | ● AGREE<br>○ DEFER | LANDLORD TO PROVIDE CABLE TV ACCESS — 1406 | ● AGREE<br>○ DEFER |
| 4. AGREED LANDLORD & TENANT CONTRIBUTION TO WORKS? | ○ AGREE<br>● DEFER | ⎵ 1407 | ○ AGREE<br>● DEFER |

1401 → 1. DELIVER ON "TURNKEY" BASIS?
1402 → 2. DELIVER IN "AS-IS" CONDITION?
1403 → 3. AGREED DEFINITION OF LANDLORD'S WORKS
1404 → 4. AGREED LANDLORD & TENANT CONTRIBUTION TO WORKS?

[VIEW LEASE PROPOSAL]  [DONE]  [COMMENT]

FIG. 14

Issue Lease Proposal

TO:
FROM:
RE:
DATE:
Name of Recipient:
Landlord or Current Tenant:
Company Name of Tenant:
Office Location:
Size:
Address of Proposed office:
Current Measurement of Space:
Lease Term:
Rent:
Lease Start:
Rent Start:
Rent Increase:

Landlord's Work: 

Other Improvements: 

Break Option: 

Renewal Option: 

Expansion Option: 

Charges: 

Parking: 

Termination: 

Name of Sender:

Back  Next

FIG. 16

Preview

Lease Proposal

TO: Robert Andrews

FROM: Joe Smith

RE: KPMG Boston

DATE: 6/16/2000

Dear Robert Andrews

The following is a proposal for the lease or sublease of offices of [insert name of landlord or current tenant] by [Company Name] at Leatherhead, England

Premises: circa 1000 m2 [compute sq. ft.] of rentable space on the 850 floor- of the xxxx building located at [insert address]. Space to be measured based on [current measurement of space or prevailing market practices].

Lease Term: [insert number of years or months]

Rent: $400 per m2

Lease Start: [insert date for commencement of the lease]

Rent Start: [insert date for start of rent if after Lease Start]

Rent Increase: [insert CPI/indexation if any or other rent increase]

Landlord's Work: [insert condition in which landlord is to deliver the office premises if the landlord is responsible to make any alterations, linking if required to a separate document that describes the works, and whether the cost is paid by the landlord, paid by the tenant, or shared between the parties]

Other Improvements: [insert other improvements provided by landlord in the premises including furniture, network systems or telecommunications systems,, linking if required to a separate document with a more detailed description or inventory of improvements]

Break Option: [insert any options granted to tenant to terminate the lease before the end of the lease term including the effective date of break, required advance notice, and payment of penalties (if any) to landlord

Renewal Option: [insert any options granted to tenant to renew the office premises including the number of lease terms, the advance notice, and method for calculation of rent increase].

Expansion Option: [insert any options granted to tenant to lease additional office space in

FIG. 17A the buildling or buildings in which the offices are located, including any rights of refusal to lease additional space].

Charges: [insert rent cost per m² in local currency and convert to $ per sq. ft. of any operating expenses to be paid by tenant for use of office space]

Parking: [insert the number of parking spaces to be rented and the annual cost per space in local currency and convert to $ per sq. ft.]

Termination: [insert the condition in which the tenant must leave the premises upon termination of the lease, choosing among a) return the premises to the landlord in good condition, reasonable wear and tear excepted, b) return the premises to the landlord in its original condition with no allowance for reasonable wear, or c) other condition to be mutually agreed.]

This proposal is subject to the approval of [insert company name of tenant] corporate management. Under no circumstances shall this proposal constitute a binding legal commitment on behalf of [insert company name of tenant] to lease the above premises.

Please confirm in writing that the above proposed terms and conditions are acceptable. Thank you.

Best regards,

Joe Smith

[ Done ]

FIG. 17B

Global Lease Link
Project Number xxxx
Preliminary Project Schedule

| | | |
|---|---|---|
| I. | Confirm Lease Proposal & Agree Schedule | 23 Jun 2000 |
| II. | Resolve Outstanding Business Issues | 30 Jun 2000 |
| III. | Agree Lease Deliverables | 01 Jul 2000 |
| IV. | Define Tenant Environment | 07 Jul 2000 |
| V. | Finalize Legal Documents | 10 Jul 2000 |
| VI. | Obtain Approvals and Execute Documents | 15 Jul 2000 |
| VII. | Complete Landlord Works | 15 Aug 2000 |
| VIII. | Complete Tenant Works | 30 Sep 2000 |
| IX. | Issue Best Practice Report | 07 Oct 2000 |

FIG. 18

Local Service Provider- Architect/Interior Designer
Request for Proposals
Scope of Services

Phase I: Space Programming and Adjacencies

XXX has prepared a one-page program summary. Architect will meet XXX to review this document and discuss adjacencies. Maximum cost not to exceed LC xxxxx

Phase II: Preliminary Plan and Building Survey

Architect will visit two buildings and receive preliminary CAD space plans for each. Architect will prepare "block plans" for XXX's review. Based upon XXX's feedback and comments, Architect will revise plans and make a preliminary fit of furniture using generic templates that approximate current and required furniture. Architect will review building systems and other base building specifications and, based upon XXX's needs, advise if any problems are anticipated.

Phase III: Preliminary Specification and Cost

Based on an agreed preliminary plan, Architect will prepare a 2 to 3 page summary of required works including partitions, carpeting, ceiling, electrical distribution and lighting requirements, and air-conditioning/ventilation needs (normal except for server room), along with preliminary quantities and cost. Architect will estimate the time to complete these works. Architect will not specify server or telephone systems.

Phase IV: Review of Landlord Proposal and Cost Estimates

Architect will meet with landlord to review their response to specifications and will prepare an estimated cost for work not included in landlord's "building standard" fitout.

Phase V: Preparation of Lease Documents

Architect will prepare detailed plans of works to be completed by landlord including partition, ceiling/lighting, electrical, and ventilation plans along with quantity measurements. Architect will provide a written specification of landlord's work including interior finishes. Architect will prepare a furniture plan based upon an inventory to be provided by XXX. Assume that all requirements for furniture shall be competitively bid to local vendors, and that Architect shall not accept compensation from any furniture vendors.

Phase VI: Project Monitoring and Coordination

Landlord will be responsible for a turnkey delivery of XXX's fitout requirements. Architect will inspect progress of works and report any difficulties. Architect will also coordinate schedule for delivery and installation of XXX's furniture, data cabling, telecomm, and security systems.

Phase VII: Handover of Premises

Prior to occupancy, Architect will accompany XXX on a final inspection of premises to accept the landlord works and/or agree on a defects list.

FIG. 19A

Phase VIII: Relocation Management

Architect will coordinate all aspects of the move into the new premises including moving schedules, and relocation (if any) of furniture, telephone and server systems. Architect will indicate if they do not provide this service.

FIG. 19B

| Phase | Assign. Responsible Party | |
|---|---|---|
| Agree Lease Proposal and Schedule | Note: If more than one party will be assigned to be responsible for decisions within a particular phase, click onto Details to assign responsibility for partic decisions. | |
| | Tenant Assigned Party: | Landlord Assigned Party: |
| | Company: Realtor Plus (2001)<br>User Name: Jack Realtor (2002)<br>Role: Real Estate Agent (2003)<br>Is party registered? Yes ● No ○<br>Register Party | Company: Landlord Holdings Inc<br>User Name: Bob Worker<br>Role: Real Estate Agent<br>Is party registered? Yes ● No ○<br>Register Party |
| Resolve Outstanding Business Issues | Note: If more than one party will be assigned to be responsible for decisions within a particular phase, click onto Details to assign responsibility for partic decisions. | |
| | Tenant Assigned Party: | Landlord Assigned Party: |
| | Company: Brokers Plus (2004)<br>User Name: Steve Smart (2005)<br>Role: Contract Manager (2006)<br>Is party registered? Yes ● No ○<br>Register Party | Company: Landlord & Co.<br>User Name: Joe Landlord<br>Role: Landlord<br>Is party registered? Yes ○ No ○<br>Register Party |
| Agree Landlord Lease Deliverables | Note: If more than one party will be assigned to be responsible for decisions within a particular phase, click onto Details to assign responsibility for partic decisions. | |
| | Tenant Assigned Party: | Landlord Assigned Party: |
| | Company: Office Plus<br>User Name: Susan Smith<br>Role: Architect<br>Is party registered? Yes ● No ○<br>Register Party | Company: Landlord Holdings Inc<br>User Name: Bob Worker<br>Role: Architect<br>Is party registered? Yes ● No ○<br>Register Party |
| Define Tenant Environment | Note: If more than one party will be assigned to be responsible for decisions within a particular phase, click onto Details to assign responsibility for partic decisions. | |
| | Tenant Assigned Party: | Landlord Assigned Party: |
| | Company:<br>User Name: | Company:<br>User Name: |

| Listing ID | Trans. ID | Type | Country | City | Size (m²) | Annual Rent ($) | Total Rent ($) | Transaction Start Date | Current Status | Schedule Status | Current Contract | |
|---|---|---|---|---|---|---|---|---|---|---|---|---|
| 001 | 0001 | Acquire | England | London | 9000 | 250,000 | 750,000 | 1 Jun 01 | Phase 1 | +2 | clbergin | Details |
| 001 | 0080 | Dispose | Germany | Frankfurt | 8070 | 210,000 | 840,000 | 15 Jun 01 | Phase 7 | +1 | sgreco | Details |
| 001 | 0010 | Acquire | USA | New York | 8000 | 200,000 | 1,000,000 | 21 Jun 01 | *Complete* | 0 | atang | Details |
| 003 | 0090 | Dispose | Switzerland | Zurich | 6509 | 170,000 | 1,020,000 | 28 July 01 | Phase 2 | +10 | atang | Details |
| 004 | 0101 | Acquire | Germany | Berlin | 5408 | 150,000 | 1,050,000 | 10 Aug 01 | Phase 1 | +2 | clbergin | Details |
| 005 | 0074 | Dispose | France | Paris | 4600 | 134,000 | 1,072,000 | 31 Aug 01 | Phase 8 | -7 | atang | Details |
| Totals: | | | | | 41,587 | 1,114,000 | 5,732,000 | | | | | |

Notes:
Annual Rent = Size x Contract Rent per m²
Total Rent = Annual Rent x Minimum Lease Term for proposed contract

Transaction Report

Listing ID: 001

Transaction ID: 0001

| Phase | Scheduled Start Date | Scheduled End Date | Actual Start Date | Actual End Date | Differential | Current Contact |
|---|---|---|---|---|---|---|
| I | 6/1/01 | 6/10/01 | 6/1/01 | 6/12/01 | +2 | clbergin |
| II | 6/11/01 | 6/15/01 | 6/12/01 | 6/16/01 | +1 | sgreco |
| III | 6/16/01 | 6/21/01 | 6/17/01 | 6/21/01 | 0 | atang |
| IV | 6/22/01 | 7/5/01 | 6/22/01 | 7/3/01 | -2 | clbergin |
| V | 7/6/01 | 7/18/01 | 7/6/01 | *OPEN* | *OPEN* | sgreco |
| VI | 7/19/01 | 7/28/01 | *OPEN* | *OPEN* | *OPEN* | atang |
| VII | 7/29/01 | 8/10/01 | *OPEN* | *OPEN* | *OPEN* | clbergin |
| VIII | 8/11/01 | 8/20/01 | *OPEN* | *OPEN* | *OPEN* | sgreco |
| IX | 8/21/01 | 8/31/01 | *OPEN* | *OPEN* | *OPEN* | atang |

View Transaction

Back

FIG. 24

Global Office Link℠

New Transaction

Access
Transactions

Schedule

Message Log

Message

Reports

OFFICE LISTINGS | GLOBAL LEASE LINK | GLOBAL SALE LINK | ACCOUNT INFORMATION | BEST PRACTICES | SUPPORT SERVICES

Transaction Message Log

| Message ID # | To | From | Subject | Date | Status | Attachment | |
|---|---|---|---|---|---|---|---|
| 1 | RE Rep | Agent | Lease Proposal | 2/28/2001 | Read | Lease Proposal | View |
| 2 | PM | RE Rep | User Group Representative | 3/12/2001 | Read | | View |
| 3 | RE Rep | Agent | Lease Start Date | 3/28/2001 | Read | Legal Document | View |
| 4 | User | RE Rep | Selection of Architect | 4/2/2001 | Read | Other | View |
| 5 | Agent | RE Rep | Headcount Plans | 4/6/2001 | New | Corporate Form | View |
| 6 | Arch | PM | Furniture Selection | 4/8/2001 | New | Plans | View |
| 7 | Agent | RE Rep | Initial Draft Lease | 4/9/2001 | New | Legal Document | View |

FIG. 25

Global Office Link(SM)

Contact | About Us | Home | Logout

| OFFICE LISTINGS | GLOBAL LEASE LINK | GLOBAL SALE LINK | ACCOUNT INFORMATION | BEST PRACTICES | SUP |

Sale Link Application

Global Sale Link Phases

ENTER TRANSACTION NUMBER: [ ] GO — 2601

Introduction

2600:
- I. Confirm Business Terms and Schedule
- II. Resolve Outstanding Business Issues
- III. Agree Seller's Deliverables and Buyer's Conditions
- IV. Finalize Purchase & Sale Document
- V. Obtain Approvals and Sign Contract
- VI. Complete Buyer's Due Diligence
- VII. Complete Seller's Works and Deliverables
- VIII. Complete Transaction and Closing
- IIX. Issue Best Practice Report

FIG. 26

![Global Office Link - Global Sale Link interface]

Global Office Link

Contact | About Us | Home | Logout

OFFICE LISTINGS | GLOBAL LEASE LINK | GLOBAL SALE LINK | ACCOUNT INFORMATION | BEST PRACTICES | SUP

*Sale Link Application*

Global Sale Link

Project Number: 00000001

I. Confirm Sale Proposal and Schedule

In this phase the Buyer and Seller will summarize the terms and conditions they have agreed upon for sale of the property and/or assets, and a Sale Proposal and schedule will be agreed upon.

[ I ▼ ] [ GO TO ]

| Decision | Buyer (2712) | Seller (2711) | |
|---|---|---|---|
| 2701 — 1. Agreed Sale Price? | Agree ▼ | Agree ▼ | Details — 2713 |
| 2702 — 2. Agreed on Description of Assets? | Defer ▼ | Agree ▼ | Details |
| 2703 — 3. Agreed Structure of Transaction? | Defer ▼ | Defer ▼ | Details |
| 2704 — 4. Agreed Payment Terms? | ------ ▼ | ------ ▼ | Details |
| 2705 — 5. Agreed Other Conditions to Sale? | ------ ▼ | ------ ▼ | Details |
| 2706 — 6. Agreed Deposit? | ------ ▼ | ------ ▼ | Details |
| 2707 — 7. Agreed Closing Date? | ------ ▼ | ------ ▼ | Details |
| 2708 — 8. Issue and Agree on Schedule? | ------ ▼ | ------ ▼ | Details |
| 2709 — 9. Issue and Agree Sale Proposal? | ------ ▼ | ------ ▼ | Details |

2710 — View Draft Sale Proposal

Message

[Done]

Global Office Link[SM]

Contact | About Us | Home | Logout

OFFICE LISTINGS | GLOBAL LEASE LINK | GLOBAL SALE LINK | ACCOUNT INFORMATION | BEST PRACTICES | SUP

Sale Link Application

Global Sale Link

Project Number: 00000001

II. Resolve Outstanding Business Issues: Payment Terms

| Decision | Buyer | Seller | |
|---|---|---|---|
| 2901 Agree on Resolution Method | ----- | ----- | Resolve — 2906 |
| 2902 Select a Local Service Provider | ----- | ----- | Resolve |
| 2903 Resolve Issue with LSP | ----- | ----- | Resolve |
| 2904 Resolve Issue without LSP | ----- | ----- | Resolve |
| 2905 Agree Summary Documents | ----- | ----- | Resolve |

Message

[Done]

FIG. 29

Global Office Link℠

Contact | About Us | Home | Logout

OFFICE LISTINGS | GLOBAL LEASE LINK | GLOBAL SALE LINK | ACCOUNT INFORMATION | BEST PRACTICES | SUP

Sale Link Application

Global Sale Link

III. Agree Seller's Deliverables and Buyer's Conditions

In this phase the Buyer and Seller will agree on the assets to be delivered by the Seller at the closing of the transaction, and the conditions for the Buyer's purchase of the property, and (if necessary) agree to a revised Sale Proposal and a revised schedule.

[ I ▼ ] GO TO

| Buyer | Decision | Seller | |
|---|---|---|---|
| Agree ▼ | 1. Checklist | Agree ▼ | Details |
| Agree ▼ | 2. Agree Seller's Building & Land Deliverables | Agree ▼ | Details |
| ----- ▼ | 3. Agree Seller's Required Building & Land Works | ----- ▼ | Details |
| ----- ▼ | 4. Agree Buyer's Mortgage Financing Condition | ----- ▼ | Details |
| ----- ▼ | 5. Agree Buyer's Due Diligence Conditions | ----- ▼ | Details |
| ----- ▼ | 6. Need a Local Service Provider? | ----- ▼ | Details |
| ----- ▼ | 7. Issue and Agree Summary Document ? | ----- ▼ | Details |

Message

[Done]

FIG. 30

Global Office LinkSM

Contact | About Us | Home | Logout

| OFFICE LISTINGS | GLOBAL LEASE LINK | GLOBAL SALE LINK | ACCOUNT INFORMATION | BEST PRACTICES | SUP |

Sale Link Application

Global Sale Link

IV. Agree Purchase & Sale Contract

In this phase the Buyer and Seller will negotiate and agree to a contract for sale of property and/ or assets and prepare final documents for signature by the parties.

[ I ▽ ] [ GO TO ]

| Buyer | Decision | Seller | |
|---|---|---|---|
| Defer ▽ | 1. Need a Local Service Provider ? | Agree ▽ | Details |
| Agree ▽ | 2. Review Draft Contract 1 | ------ ▽ | Details |
| ------ ▽ | 3. Review Draft Contract 2 | ------ ▽ | Details |
| ------ ▽ | 4. Require Additional Documents ? | ------ ▽ | Details |
| ------ ▽ | 5. Resolve Open Issues | ------ ▽ | Details |
| ------ ▽ | 6. Prepare Final Contract | ------ ▽ | Details |

Message

[Done]

Global Office Link<sup>SM</sup>

Contact | About Us | Home | Logout

| OFFICE LISTINGS | GLOBAL LEASE LINK | GLOBAL SALE LINK | ACCOUNT INFORMATION | BEST PRACTICES | SUP |

Sale Link Application

Global Sale Link

VI. Complete Buyer's Due Diligence

In this phase the Buyer will complete its due diligence studies that are specified in the contract as conditions to purchase the property and/or assets, and the Buyer will notify the Seller whether or not it will complete the transaction.

[ I ▼ ] GO TO

| Buyer | Decision | LSP* | |
|---|---|---|---|
| Agree ▼ | 1. Complete Studies of Physical Assets | Agree ▼ | Details |
| Agree ▼ | 2. Complete Review of Permits and Approvals | Agree ▼ | Details |
| Defer ▼ | 3. Complete Review of Title & Company Structure | Defer ▼ | Details |
| Defer ▼ | 4. Complete Review of Financial Information | Defer ▼ | Details |
| ------ ▼ | 5. Send Completion Notice | ------ ▼ | Details |

Message

[Done]

*LSP= Professionals chosen by Buyer to provide advice and information.

FIG. 33

Global Office Link<sup>SM</sup>

Contact | About Us | Home | Logout

OFFICE LISTINGS | GLOBAL LEASE LINK | GLOBAL SALE LINK | ACCOUNT INFORMATION | BEST PRACTICES | SUP

Sale Link Application

Global Sale Link

VIII. Complete Transaction & Closing

In this phase the Buyer and Seller will sign all documents that are necessary to close the transaction, and complete the transfer of money, of financial instruments and of the property and/or assets.

[          ▼] [GO TO]

| Tenant | Decision | Landlord | |
|---|---|---|---|
| Agree ▼ | 1. Agree List of Closing Documents | Agree ▼ | Details |
| Agree ▼ | 2. Agree on Form of Final Documents | Agree ▼ | Details |
| ------ ▼ | 3. Obtain Authorizations and Guarantees | ------ ▼ | Details |
| ------ ▼ | 4. Obtain Final Account/Financial Statements | ------ ▼ | Details |
| ------ ▼ | 5. Make Final Inspections | ------ ▼ | Details |
| ------ ▼ | 6. Sign Final Documents | ------ ▼ | Details |
| ------ ▼ | 7. Transfer of Financial Consideration and Ownership | ------ ▼ | Details |

Message

[Done]

FIG. 35

Global Office Link[SM]

Contact | About Us | Home | Logout

OFFICE LISTINGS | GLOBAL LEASE LINK | GLOBAL SALE LINK | ACCOUNT INFORMATION | BEST PRACTICES | SUP

Sale Link Application

Global Sale Link

IX. Issue Best Practice Report

In this phase the Buyer and Seller will complete best practice reports that will evaluate this transaction process and the service providers who assisted with the transaction.

[ I ▼ ] [ GO TO ]

| Tenant | Decision | Landlord | |
|---|---|---|---|
| Agree ▼ | 1. Review Final Schedule | Agree ▼ | Details |
| Agree ▼ | 2. Complete Transaction Evaluation Form | Agree ▼ | Details |
| Agree ▼ | 3. Complete LSP Evaluation Form | Agree ▼ | Details |
| Agree ▼ | 4. Issue Best Practice Report | Agree ▼ | Details |

Message

[Done]

FIG. 36

METHOD AND APPARATUS FOR NEGOTIATING A CONTRACT OVER A COMPUTER NETWORK

This is a continuation-in-part of U.S. application Ser. No. 09/610,005, filed on Jul. 5, 2000.

BACKGROUND OF THE INVENTION

1. Technical Field

This invention relates generally to electronic commerce and the Internet. More particularly, the invention provides a method and apparatus for allowing two parties to negotiate and execute a contract, such as a real estate lease or a sale, over a computer network such as the Internet.

2. Related Information

Corporations frequently need to lease real estate in the form of offices, laboratories, warehouses, and other spaces. Alternatively, companies sometimes have surplus office space that could be sublet to tenants for profit or cost recovery.

Typically, companies will hire real estate brokers to search for and conduct preliminary negotiations regarding potential leasing arrangements. After preliminary details have been worked out, lawyers acting on behalf of the prospective landlords and tenants negotiate a detailed lease agreement. This process may involve numerous meetings, telephone calls, faxes, exchanges of draft documents, and the like. It also may involve various middlemen in addition to lawyers and real estate brokers. For example, if architectural or mechanical improvements are needed, one or both of the parties may hire outside contractors (e.g., architects or engineers) to assist in evaluation of lease properties and/or to propose modifications to the property.

Because of human nature and the typically unstructured methods by which leases are negotiated, parties sometimes backtrack on previously agreed-upon provisions or demand changes to lease provisions that were previously believed to be the subject of agreement. Parties may spend a large amount of time negotiating details of lease provisions that later become moot (e.g., the leasehold improvements to the premises) because of disagreements over other provisions (e.g., term of the lease). Consequently, acquiring or leasing real estate in the corporate market incurs large costs and time because of intermediaries and human interaction required to negotiate lease provisions.

Various web-based listing services have sprung up in recent years to service the real estate needs of companies looking for space, including sales, leases, and auctions. Companies such as Loopnet (www.loopnet.com), Property-First (www.propertyfirst.com), and EGPropertyLink (www.egpropertylink.co.uk) provide brokerage and listing services in an attempt to facilitate real estate transactions over the Internet. These services primarily focus on listing properties, and do little to facilitate the negotiation or consummation of real estate deals. In particular, these services do not provide process management tools to guide landlords and tenants through a structured deal. Furthermore, they do not provide a mechanism for monitoring the progress of a transaction after signature of the lease (e.g., completion of works by landlord and tenant), nor do they provide any mechanism to integrate into the process an evaluation of qualitative aspects of the transaction such as cross-border difficulties and delays, and the effectiveness of local service providers such as brokers and architects.

The negotiation of real estate leases between parties located in different countries involves additional inefficiencies and drawbacks. For example, because of different time zones, the times available for parties to meet or hold telephone conferences may be limited. Differences in currencies (e.g.,dollars versus Euros) and metrics (e.g., square feet versus square meters) add complexity to the negotiation process, thus driving up costs. Language barriers may also add additional costs.

It may be difficult for a U.S.-based prospective tenant to hire outside contractors, such as architects, in another country. Furthermore, the procedures and customs used by foreign real estate brokers and intermediaries to negotiate a corporate lease may be different depending on the country, language, and regulations. Legal documents drafted in one country may look substantially different from those typically drafted under U.S. laws and customs. These and other differences have made it very costly to negotiate leases for commercial office space across international borders.

More generally, negotiating contracts of various types, such as a corporate procurement contract or a contract related to supply-chain management applications, can incur many of the disadvantages and inefficiencies discussed above. Consequently, there exists a need to streamline the process by which prospective parties to a contract can negotiate and consummate a contract.

SUMMARY OF THE INVENTION

The present invention overcomes the aforementioned problems by providing a structured method and apparatus for allowing prospective parties to a contract to negotiate and consummate the contract.

In one embodiment, the method facilitates a structured lease negotiation between two parties to a real estate transaction. A series of predefined milestone negotiation steps are executed on a computer that couples two parties through a network, such as the Internet. Parties to the transaction answer predefined questions regarding a proposed transaction in such a manner that certain aspects of the transaction can be agreed upon early during the negotiation process while others are deferred to later phases. Additional steps of completing the lease transaction can also be included in the inventive method.

In one variation of the invention, the parties answer questions and exchange information without the simultaneous participation of each participant, such that a structured negotiation takes place over a period of time, possibly in different time zones. In each phase, parties must select from a predefined list of actions (e.g., agree or defer) associated with a particular aspect of the negotiation (e.g., rent to be charged, term of the lease, etc.). Provisions to which both parties agree are "locked in" while those that are deferred are worked out in a subsequent phase. Certain lease provisions may have subsidiary actions (e.g., lower-level agreements and deferrals) that can then be "rolled up" to the phase-level negotiation. Tools are provided to facilitate transnational aspects of the negotiation (e.g., conversion between currencies, metrics, or languages). A computer generates intermediate documents that assist in the negotiation (e.g., draft proposal letters) and identifies areas that require further negotiation.

If parties indicate that outside help is needed to define part of the contract (e.g., architect review of an office layout), a computer suggests vendors located in the geographic area of the lease property and transmits via e-mail a draft scope of services request to one or more vendors. Each party identifies corporate approvals required to complete the negotiation, and a computer-generated lease document can be printed for signatures. Feedback from the parties in the form of problems encountered and solutions achieved during the negotiation process are collected and stored in a database for review and use by other future negotiation parties.

Although the method and apparatus as described above are applicable to negotiating real estate transactions such as the sale of real estate properties, certain additional features are included in a continuation-in-part embodiment to facilitate certain sale-specific characteristics. For example, details of the actions taken in each phase can be adjusted to accommodate sale-specific terms and conditions.

More generally, the inventive principles can be used to provide a computer-implemented method of reaching agreement between two parties concerning a contract of any type, such as a corporate procurement contract or a contract related to supply-chain management applications.

Additional improvements include: (1) rules-based agreement on negotiator-supplied terms (response and dialogue box); (2) delegation to transaction team members or service providers; (3) summary reports with link to messaging system; (4) a dual messaging system; (5) customized negotiation process; and (6) sale-specific features.

Other features and advantages of the invention will become apparent with reference to the following detailed description and the figures.

BRIEF DESCRIPTION OF THE DRAWINGS

FIG. 13A shows an alternate web-based computer screen according to a continuation-in-part improvement including dialogue boxes for each negotiator.

FIG. 14 shows a web-based computer screen for negotiating details of one lease provision.

FIG. 16 shows a computer-generated lease proposal to be filled in by one or both of the parties.

FIGS. 17A and 17B show a computer-generated preview of a lease proposal to be agreed between the parties.

FIG. 18 shows a computer-generated schedule for each phase of a nine-phase lease negotiation and execution process.

FIGS. 19A and 19B show a computer-generated request for proposal for a local service provider.

FIG. 20 shows a web-based computer screen for designating members of a transaction team.

FIG. 21 shows a plurality of transactions in summary form with a linkage to a messaging system.

FIG. 24 shows another variation of a summary report, breaking out various information for each phase of a transaction.

FIG. 25 shows a message log visible to members of a transaction team showing messages that have been sent to parties negotiating a real estate transaction.

FIG. 26 shows a nine-phase negotiation process that can be used to negotiate a sale of real property between a buyer (or buyer's agent) and seller (or seller's agent).

FIG. 27 shows various decisions that can be made during a first phase of a sale negotiation.

FIG. 28 shows lower-level sale price decisions corresponding to decision element 2101 in FIG. 21.

FIG. 29 shows various decisions that can be made during a second phase of a sale negotiation.

FIG. 30 shows various decisions that can be made during a third phase of a sale negotiation.

FIG. 31 shows various decisions that can be made during a fourth phase of a sale negotiation.

FIG. 32 shows various decisions that can be made during a fifth phase of a sale negotiation.

FIG. 33 shows various decisions that can be made during a sixth phase of a sale negotiation.

FIG. 35 shows various decisions that can be made during an eighth phase of a sale negotiation.

FIG. 36 shows various decisions that can be made during a ninth phase of a sale negotiation.

DETAILED DESCRIPTION OF THE PREFERRED EMBODIMENTS

Figure 1A:
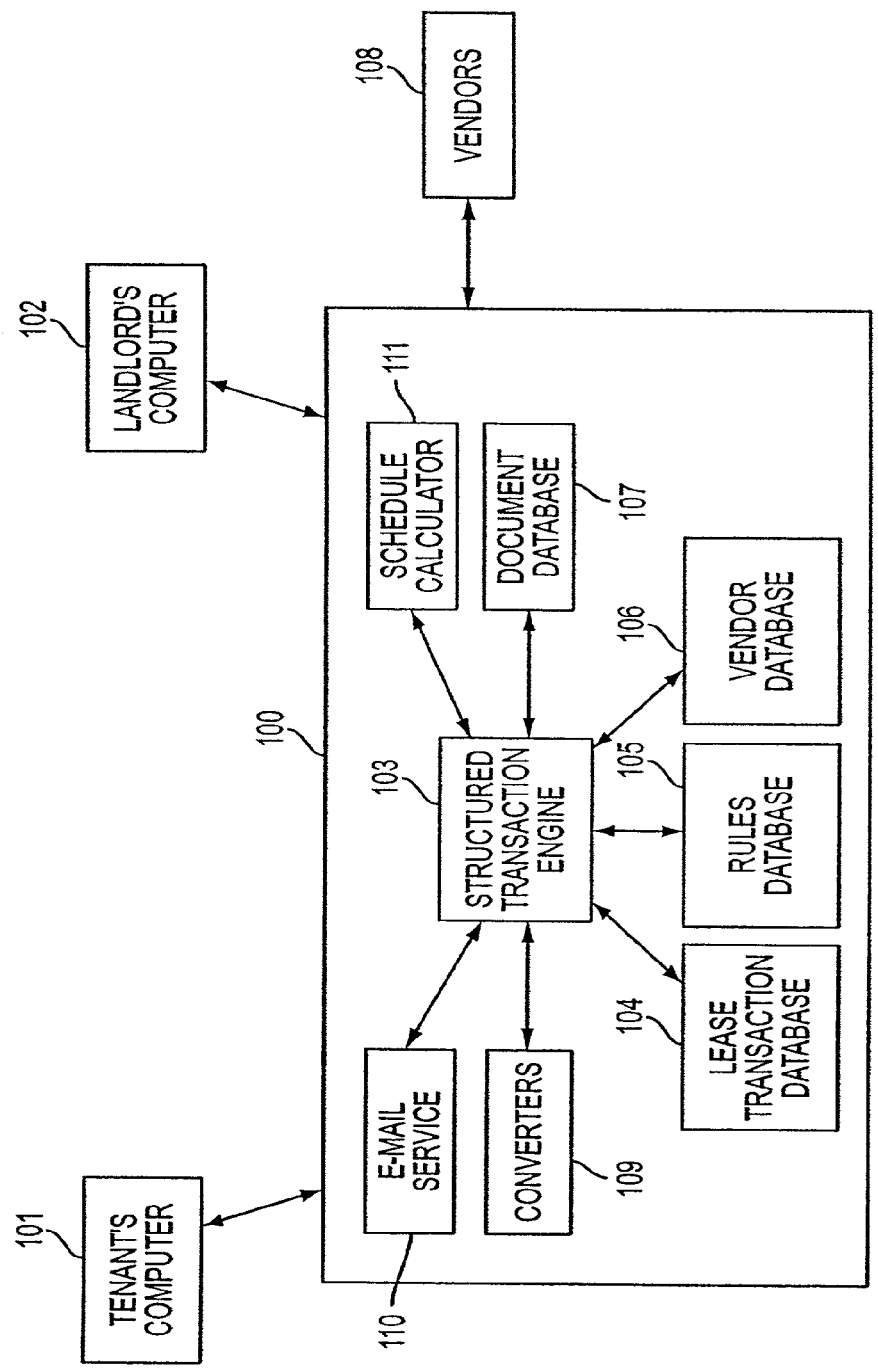
FIG. 1A shows a system for facilitating a real estate lease transaction between a prospective tenant and prospective landlord using a computer-driven structured negotiation technique.

FIG. 1A shows a system for facilitating a real estate lease transaction between a tenant and a landlord. Although the terms "landlord" and "tenant" will be used generally to refer to actual parties to a lease negotiation, those terms also encompass agents or others acting on behalf of the ultimate landlord or tenant. It is also possible that there will be more than one landlord or tenant to a transaction. It should also be understood that a tenant in one context could in fact act as a landlord in another context. For example, a tenant that needs to dispose of part of a leasehold interest could be considered a landlord in the context of the invention. A landlord having an existing lease with a tenant may act in concert with the tenant to sublet the property to another tenant; in that context, the landlord and original tenant could both be considered landlords while the prospective new lessee would be the tenant. In summary, the terms "landlord" and "tenant" may have a variety of meanings dictated by the particular context.

According to the system of FIG. 1A, a prospective tenant operates a computer 101 to negotiate a real estate lease with a prospective landlord, who operates a separate computer 102. The parties negotiate the lease through a computer 100 that implements a structured transaction. Computer 100 may comprise a web site that stores and generates web pages accessible over the Internet to both parties, each of whom may be located in different countries and time zones. Additionally, one or more vendor computers 108 may also communicate with computer 100 as described in more detail herein. Alternatively, the functions associated with computer 100 can be implemented in computer 101 or 102, or a combination of the two computers, such that no physical third computer is required.

According to one aspect of the invention, each lease is negotiated using a computer-implemented process that guides the parties through various negotiation phases. Although the invention will be described with reference to a nine-phase negotiation and execution process, the invention is not limited in this respect, and it will be appreciated that a different number of negotiation phases can be used without departing from the scope of the invention. Any or all of the steps described herein can be implemented in software and stored on computer-readable media for execution in a computer.

In one embodiment, a structured transaction engine 103 controls the negotiation process by displaying web pages containing predefined choices for various aspects of the transaction within each negotiation phase, and by comparing choices made by each party on each web page to rules stored in a rules database 105. Rules database 105 and engine 103 can comprise an expert system or other type of knowledge base that stores information concerning allowable inputs from each user for each phase. Alternatively, the logic used to control the operation of the negotiation (and to flag errors or conflicting information entered by users) can be incorporated into software using a procedural or object-oriented language.

Structured transaction engine 103 stores information entered by each party into a lease transaction database 104, which maintains information concerning each evolving lease negotiation. Multiple leases may simultaneously be under negotiation at any one time among different sets of negotiators, such that lease transaction database 104 contains information for different leases in various stages of negotiation. Vendor database 106 contains information concerning various third-party vendors (e.g., architects, engineers, lawyers, interior designers, and the like) and their associated contact information (e.g., city, country, e-mail address, telephone and fax number). Document database 107 contains certain standard document templates that can be used to construct a completed lease and other intermediate documents based on information provided by the parties during the negotiation process.

One or more converters 109 provide conversion functions (e.g., Euros to dollars, square feet to square meters, and vice versa) to facilitate the negotiation of particular aspects of each lease. An e-mail service 110 can also be included to allow parties to a negotiation to transmit and receive messages, including attachments such as draft documents, during the negotiation process. Schedule calculator 111 calculates a proposed schedule corresponding to milestones during the negotiation and execution phase, based on average actual lengths of time stored in a database. In one variation, the lengths of time stored in the database are based on or derived from previously negotiated contracts (i.e., real-world practice is used to project future schedules). For example, if over the course of five different negotiated leases the average amount of time needed to go from generating a draft lease to moving into the leased property is two months, the scheduler would use that value to schedule such a milestone two months before the lease move-in date.

In accordance with one aspect of the invention, the parties answer questions presented on web pages according to a computer-implemented transaction sequence, such that the parties can quickly identify areas of agreement and resolve areas of disagreement in an efficient manner. The lease negotiation can be conducted across great distances (e.g., across the Atlantic Ocean) and in different time zones through the use of a computer network such as the Internet. Because both parties are forced to conform to a highly structured, well-defined transaction sequence for negotiation, errors and misunderstandings can be greatly reduced. Moreover, computer software can be used to quickly identify areas of agreement and offer alternatives for resolving areas of disagreement.

Figure 1B:
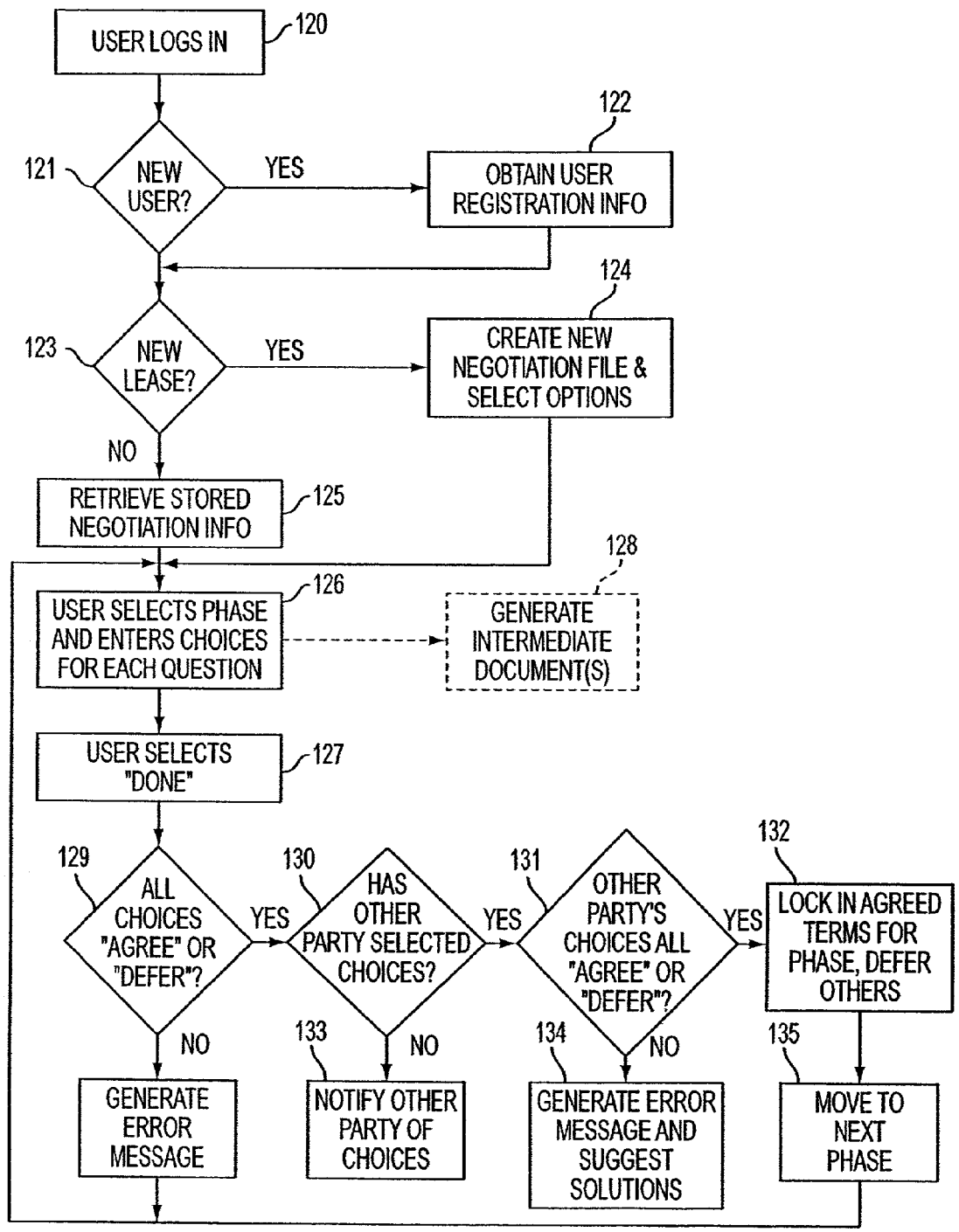
FIG. 1B shows a computer-implemented method for allowing two parties to negotiate a lease transaction using structured negotiation phases.

FIG. 1B shows a computer-implemented method for negotiating a lease transaction using structured negotiation phases. As shown generally in these figures, each party can independently log into a web-based transaction management system (e.g., computer 100 of FIG. 1A) and negotiate lease terms by selecting choices from transaction display screens. In one embodiment, parties are prevented from advancing to the next negotiation phase unless the computer detects that each user has either agreed to a specific lease term, or that each user has elected to defer agreement on a term until a later negotiation phase.

Each lease provision can be negotiated by taking one of several predefined actions. In one embodiment, at each top-level negotiation phase, a party must either AGREE or DEFER on each lease provision (e.g., by selecting a choice or clicking on an icon representing a choice). Each of these choices in turn can result in or derive from lower-level actions by involving lower-level decisions. In other words, before a party is prepared to AGREE or DEFER on a lease provision, lower-level decisions involving steps of mediation, issuance of third-party requests for assistance, or other types of actions may need to be taken. These lower-level decisions can be reached using additional computer screens that are linked to one or more of the higher-level screens.

More generally, the negotiation, execution and evaluation of a lease can be accomplished according to one aspect of the inventive principles using a reduced instruction protocol that facilitates and accelerates milestone decisions associated with the transaction. Such a protocol provides numerous benefits because, among other things:

(a) The lease transaction process is complex and can involve numerous participants and, in a cross-border context, these participants will most likely reside in different countries;

(b) There are varying degrees of skill among the representatives of the landlord and tenant and, in a cross-border context, varying levels of understanding of their respective roles and responsibilities;

(c) In a cross-border context, there are language problems, local knowledge gaps and cultural differences that can slow down negotiations;

(d) In a cross-border context, a computer application for this process functions best when it prescribes a clear set of top-level decisions (milestones) with a mechanism for coordinating the roles and actions of those who participate in reaching these decisions.

One embodiment of the protocol includes the following three elements, although other embodiments incorporate fewer than all three elements:

1. Decision Protocol

The parties must either agree or defer to all milestone decisions. This acknowledges that milestones are critical to completing the project, and that it is important to avoid the dead-end implied by using the word "no" (which is considered impolite or is non-existent in some cultures). The computer provides a facility for either agreeing or deferring on each milestone decision. In addition, displayed with each milestone decision is a dialogue box to enter a comment, or an icon to indicate that a comment has been entered and will be visible on another screen. Predefined actions in this category include:

Agree: a party acknowledges that a milestone decision has been reached (e.g., agreement on a specific monthly rent).

Defer: a party agrees to defer a milestone decision to a later date (e.g., defer a decision on the condition of the premises).

2. Resolution Protocol

Assuming that all milestone decisions must be agreed to complete the process, an additional mechanism can be used to convert deferrals into agreements. Therefore, the protocol provides three resolution mechanisms, including: (a) a user forum; (b) use of a Local Service Provider (LSP); or (c) mediation. The computer facilitates selection of LSP's or mediators (via menus of service providers, issuing scopes of services, etc.), and schedules meetings among the participants in these decisions. Three corresponding predefined actions in the resolution protocol category include:

Forum: the transaction parties (i.e., the landlord and tenant) meet in a structured environment (e.g., scheduled by computer) to agree on a milestone decision.

LSP: the parties agree to select a third party local service provider or providers (e.g., an architect) to facilitate reaching a milestone decision.

Mediate: the parties agree to select a neutral expert to facilitate reaching a milestone decision.

3. Action Protocol

The computer prescribes a sequence of milestone decisions to complete the process. For some milestones, additional work must be done to reach an agreement or deferral. The protocol streamlines this work into a prescribed set of actions that are required of the participants (i.e., the landlord, tenant, and LSPs), and which can be undertaken with computer assistance. The computer acts as an engine to provide adequate information and resources on the desktop of the landlord and tenant. Examples include distributing documents such as draft leases; issuing standardized documents such as Requests For Proposals (RFPs), specification of leasehold improvements, etc; notifying parties if any schedule dates have been missed or any input errors have occurred; and scheduling meetings among the participants.

In addition, the computer can prompt the participants about certain elements in the process. Examples include prompting the parties to identify resource persons; prompting the parties to negotiate certain aspects of tenant's physical environment; and prompting the parties to obtain signatures to certain documents.

It is anticipated that the computer can provide additional assistance in the more restricted roles by suggesting various courses of action. For example, if the parties had not resolved the delivery of the tenant's space on a "turnkey" basis, the computer could suggest that the parties agree to split the cost of the improvements above the landlord's "building standard" on a 50/50 basis. More generally, the computer can draw upon a library of potential solutions based on past practice to suggest resolution to certain milestone decisions or sub decisions. This facility could be visually displayed alongside any required future action. Examples of predefined actions in this action category include:

Identify: the computer prompts the parties to locate an appropriate internal resource person or entity. For example, prompt to identify authorized signatory for lease.

Issue: the computer issues a standardized document to the parties or to LSPs. For example, the computer can issue a request for proposals to one or more architects.

Notify: the computer sends a notice to the parties and/or LSPs if actions are erroneous or milestones are not completed by the scheduled dates. For example, the computer can notify the parties that a scheduled date for signature of lease has been missed.

Obtain: the computer prompts the parties to generate information from internal resources. For example, the computer can prompt the parties to obtain approvals for lease.

Provide: the computer prompts the parties as to generally submit information in support of a milestone decision. For example, the computer can prompt a party to submit a preliminary cost estimate for leasehold improvements.

Require: the computer can ask the parties whether they require standardized documents to assist in reaching milestone decisions. For example, the computer can ask the parties whether they require a broker RFP.

Receive: the computer receives and subsequently transmits in a summary form documents from third parties. For example, the computer can receive and transmit a response to a broker RFP.

Resolve: the computer prompts the parties or an LSP to reach agreement on detailed matters related to third party documents. For example, the computer can prompt parties to resolve outstanding provisions of lease agreement.

Schedule: the computer arranges meetings in a format chosen by parties and/or LSPs. For example, the computer can schedule a user forum to agree on outstanding lease issues.

Send: the computer transmits documents to parties. For example, the computer can transmit a draft lease to one of the parties or LSPs.

Select: the computer prompts the parties to make choices among alternatives provided on a screen or box. For example, a computer can prompt a party to select a mode for a user forum.

It will be appreciated that the above examples of predefined actions are exemplary only; different labels or actions can be specified, and each action can be selected using a pictographic icon or other means to facilitate communication across languages (e.g., a handshake icon to signify agreement on a lease provision).

In addition to selecting a pre-defined response such as one selected from the above choices, each party may also in certain circumstances enter ancillary information that is associated with and stored with the response. For example, if one party suggests a delivery date of October 1 for a leased property (and indicates AGREE for that date), the other party may instead suggest a delivery date of November 1 for the property. If both parties have selected AGREE but have entered different values, the computer would flag the discrepancy and possibly suggest a solution (e.g., split the difference). Alternatively, a single text entry box could be provided, and each party could override the other's entry, with the computer flagging any overridden value (and, in one embodiment, changing the first party's AGREE choice back to a default value or some other choice).

If both parties select the same response (e.g., one of the responses selected from the above list), then the agreed status of the particular lease term is deemed to be "locked in" and not subject to further negotiation. This is intended to facilitate the negotiation status by preventing parties from "back-tracking" to items that were previously the subject of agreement. However, the invention is not limited in this respect, and certain variations of the invention include allowing users to change previously matched responses.

Beginning in step 120 of FIG. 1B, the parties independently log into the system (e.g., using a user name and password). A user can include a party to the negotiation (e.g., a landlord or tenant), although it could also include agents or others acting on behalf of principals to the negotiation. In step 121, if a user is not recognized, then in step 122, user registration information (e.g., name, address, e-mail address, and the like) is obtained. In step 123, a check is made to determine whether the user seeks to negotiate a new lease or continue negotiating a previously started lease.

If a new lease is selected, then in step 124 a new negotiation file is established, and each user can select options such as the currency to use for displaying negotiation information and metrics (e.g., square feet or square meters). In one variation, a prospective tenant and landlord can choose to view the information in different formats, such that the tenant views the rent in dollars and the landlord views the rent in Euros, for example. Currency and metrics converters (function 109 in FIG. 1A) are used to automatically convert between units entered by the users based on currency exchange rates. In another variation, values are shown simultaneously in two formats (e.g., square meters and square feet), and the parties can select what formats are to be displayed (e.g., dollars and Euros simultaneously, or dollars and French francs simultaneously). It is assumed that currency exchange information is stored in a database or accessible over a network such as the Internet.

If negotiations regarding a previously started lease are to be resumed, then in step 125 computer 100 retrieves previously stored negotiation information from database 104. In step 126, each user (i.e., each tenant and landlord) selects a negotiation phase and enters choices for decisions to be reached during each phase. According to the invention, each party can log on independently and at different times to negotiate the lease, so that it is not necessary to have simultaneous participation by the parties. Of course, it is possible that the parties might log in at overlapping times, and in such a case the system can prevent both users from modifying the same data at the same time (e.g., using file or database locks, for example).

Step 126 can involve subsidiary steps of negotiating particular aspects of a lease provision before agreement or deferral on the provision is reached. For example, before a party is prepared to agree to a lease provision defining the condition of the premises, several sub-decisions may be involved, such as determining what types of electrical systems will be provided, what type of security system is included, etc. These provisions can be negotiated using lower-level computer screens that invite the user to make selections based on pre-defined choices. In one embodiment, the computer indicates to the user that sub-decisions are involved, and prompts the parties to ensure that such sub-decisions are addressed. Alternatively, if the tenant has for example agreed to take the premises in "as-is" condition, these lower-level decisions will be unnecessary, and the computer can avoid prompting the tenant for these choices.

If in step 127 a user specifies that he or she is done entering information, then processing advances to step 129. At various points during the process, each user may optionally choose to generate one or more intermediate documents (e.g., a draft lease proposal or the like) depending on the negotiation phase in which the user is participating (see step 128). Further details of this optional step are provided below.

In step 129 the computer checks to determine whether all of the choices selected by the user in the negotiation phase are either AGREE or DEFER. If so, then in step 130 another check is made to determine whether the other party has also selected choices for the particular negotiation phase. If not, then in step 133 an e-mail message or other notification is transmitted to the other party inviting that party to review the responses provided by the first user. If further explanation is required, the computer can provide a summary of the phase with some frequently asked questions. Additionally, the computer can provide a comment or dialogue box for each phase to facilitate direct communication between the parties. Processing then either terminates or returns to a previous step (e.g., step 125 of FIG. 1B).

If in step 130 the other party to the negotiation has also selected choices for the particular negotiation phase, then in step 131 a check is made to determine whether all of the choices specified by the other party are either AGREE or DEFER. If not, then in step 134 an error message is generated and solutions are suggested. For example, if one party has selected AGREE for a particular lease provision but the other party has selected DEFER, the computer can suggest that the agreeing party DEFER the decision until the next negotiation phase. As another example, if one party has agreed to $5,000 per month rent but the other party has agreed to $6,000 per month rent, the computer can flag the discrepancy and suggest a compromise rent of $5,500 per month.

Alternatively, a single text box can be provided for entering a value such as rent, thus allowing each party to override the other's value. In one variation, the computer would then change the choice of the party whose value was overridden from AGREE to undecided or some other choice and generate a message indicating that the first party had changed the value. In yet another embodiment, if the two parties had agreed on different amounts, the computer would change both AGREE choices to DEFER, such that the decision would be deferred to a later negotiation phase.

If in step 131 both parties have selected either AGREE or DEFER for all lease terms pertaining to the particular negotiation phase, then in step 132 the agreed terms are deemed "locked in" by the computer and not subject to further change; all those for which the parties have indicated DEFER are deferred by the computer until a later negotiation phase. Thereafter, in step 135 the user is permitted to advance to the next negotiation phase (e.g., one of the nine negotiation phases shown in FIG. 2). The previous steps beginning at step 126 are then repeated for each phase until the negotiation has been concluded.

Assuming in step 129 that the user did not choose either AGREE or DEFER for each item in the negotiation phase, then an error message is generated, and processing returns to step 126. It will be appreciated that options other than AGREE or DEFER can be provided without departing from the scope of the invention. Moreover, graphical icons (e.g., a handshake symbol instead of an AGREE choice) can be used. Choices can also be shown in different languages to the different parties, such that one party to the transaction sees choices in English while the other party to the negotiation sees the same choices in Spanish, for example.

Figure 2:
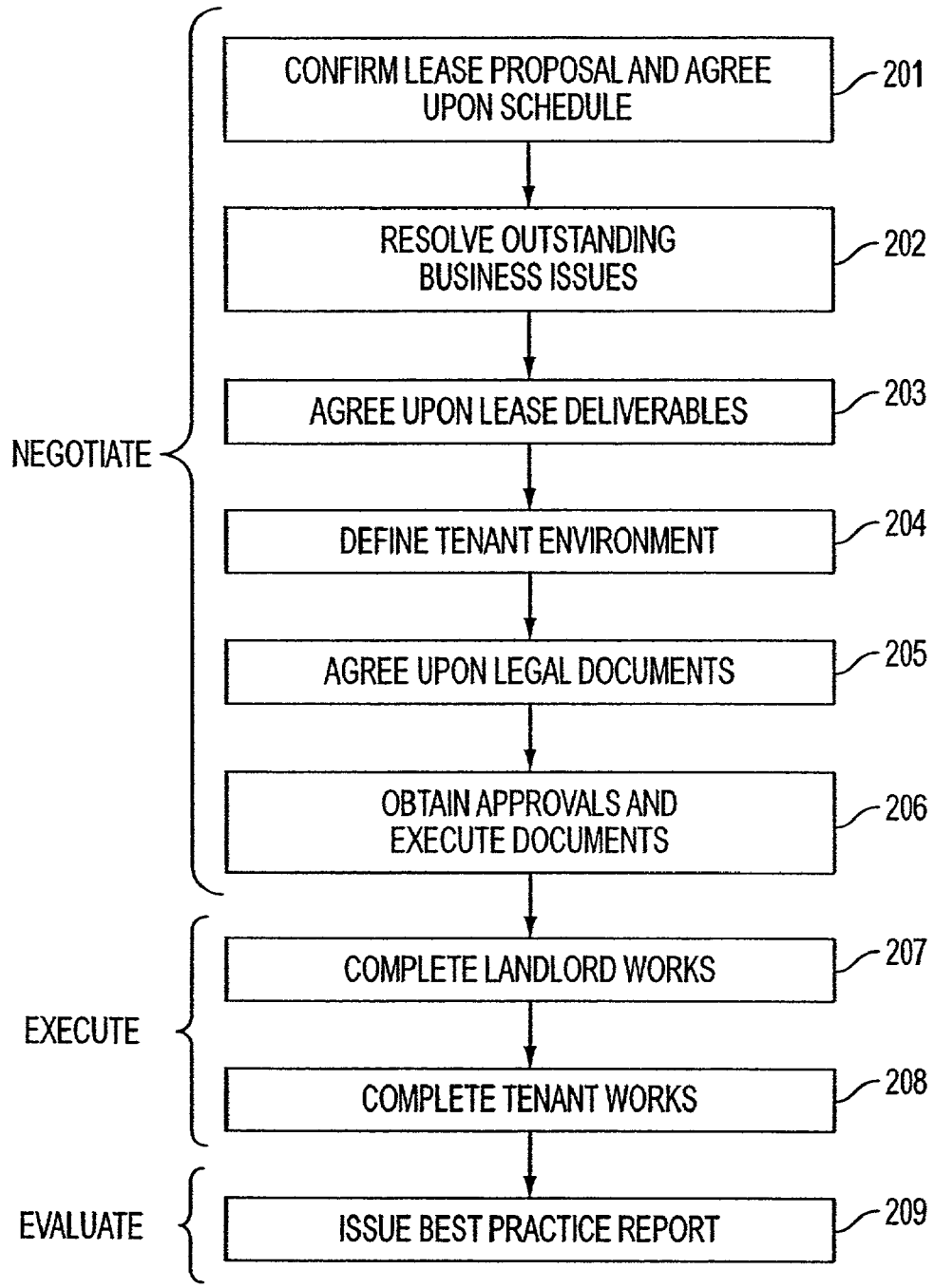
FIG. 2 shows a nine-phase computer-assisted process for negotiating and executing a lease transaction between a tenant and a landlord.

FIG. 2 shows a generalized nine phase computer-assisted process for negotiating, executing, and evaluating a lease transaction according to one variation of the invention. As explained above, in one embodiment each party is required to select agreement or deferral of certain lease provisions before the computer will allow the users to advance to the next negotiation phase. Selection of other choices for lease provisions within a negotiation phase may require ancillary communication (e.g., transmission of requests for services) or processing (e.g., submission of information). Web-based computer forms, such as those shown in FIGS. 13 through 15, can be used to select choices relating to lease provisions. Certain phases (e.g., 201 through 206) generally relate to the negotiation of a lease; other phases (e.g., 207 and 208) relate to execution of the lease, and a final phase (209) relates to evaluation of the completed lease transaction.

As shown in FIG. 2, a first phase 201 includes steps of confirming a lease proposal and obtaining agreement upon a lease schedule (e.g., delivery date). This phase is preferably conducted through the use of web-based computer display forms having appropriate selection means (e.g., radio buttons, check boxes, text boxes, pull-down menus and the like) that allow each user to enter and view information for the particular phase. Further details of one possible embodiment are provided below.

A second phase 202 includes steps of resolving outstanding business issues, wherein users are presented with a checklist of outstanding issues deferred from the first phase and prompted to develop solutions to these issues. A third phase 203 includes steps of obtaining agreement on lease deliverables (e.g., condition of the premises, furnishings, telecommunication systems, etc.). A fourth phase 204 relates to defining the tenant environment (e.g., preliminary floor plans, furniture, etc.). In this phase, the tenant defines his or her requirements to occupy the premises, including improvements and investments not provided by the landlord (which are typically included in the third phase). In the fourth phase, the landlord may or may not be involved in decisions regarding specification of furniture, network, and telecommunication systems, for example.

A fifth phase 205 relates to agreement on legal documents, including a step of generating a draft contract. A sixth phase 206 relates to obtaining approvals and execution of the lease documents, including steps of submitting forms for corporate approvals, paying deposits, etc. A seventh phase 207 relates to completing landlord works (e.g., landlord delivers landlord-supplied network system and leasehold improvements). An eighth phase 208 (completion of tenant works) includes steps such as delivering tenant-supplied furniture and telecommunications systems. This may include the use of contractors such as architects and engineers, and may or may not involve the landlord.

In the seventh and eighth phases, it is generally contemplated that the computer will perform a monitoring function of the scheduled dates for delivery of works as anticipated in the schedule, with a communication function in the event that scheduled dates are missed and a function to issue a standardized form for acceptance of works performed by the landlord and/or LSPs. Turning briefly to FIG. 18, a computer-generated schedule incorporating the major milestone phases is shown. In one embodiment, the computer generates such a schedule by using the lease move-in date as a starting point and "backing out" dates for earlier milestones using either default values or values retrieved from a database based on historically experienced lease transactions. As each date is reached, the computer can prompt the parties to agree that a particular phase has been completed, and can transmit a message to each party warning of upcoming delays if the phase is not completed. Although most milestones can be assumed to have a linear dependency (e.g., legal documents cannot be finalized until the lease proposal is agreed), it is also possible that certain milestone decisions can be deferred until later phases, such that a schedule slip in one milestone does not necessarily result in slippage for all remaining milestone decisions.

A final ninth phase (issue best practice report) includes steps of evaluating local service providers and preparing a best practice report, which is preferably stored in a database for future reference.

The following description, in conjunction with FIGS. 3 through 11 (details of each negotiation phase) and FIGS. 12 through 15 (computer-implemented forms that solicit information for each phase), explains one possible approach for implementing a method and system according to the present invention. It will be assumed that prior to performing the steps shown in FIG. 3, a user has logged into the system and, if pertinent, reviewed e-mail messages in his/her account that were received from other users, such as another party to the negotiation. It will also be assumed that a web-based computer display system using well-known hyperlink technology is used to solicit and display information between parties, although the invention is not limited in this respect.

Figure 12:
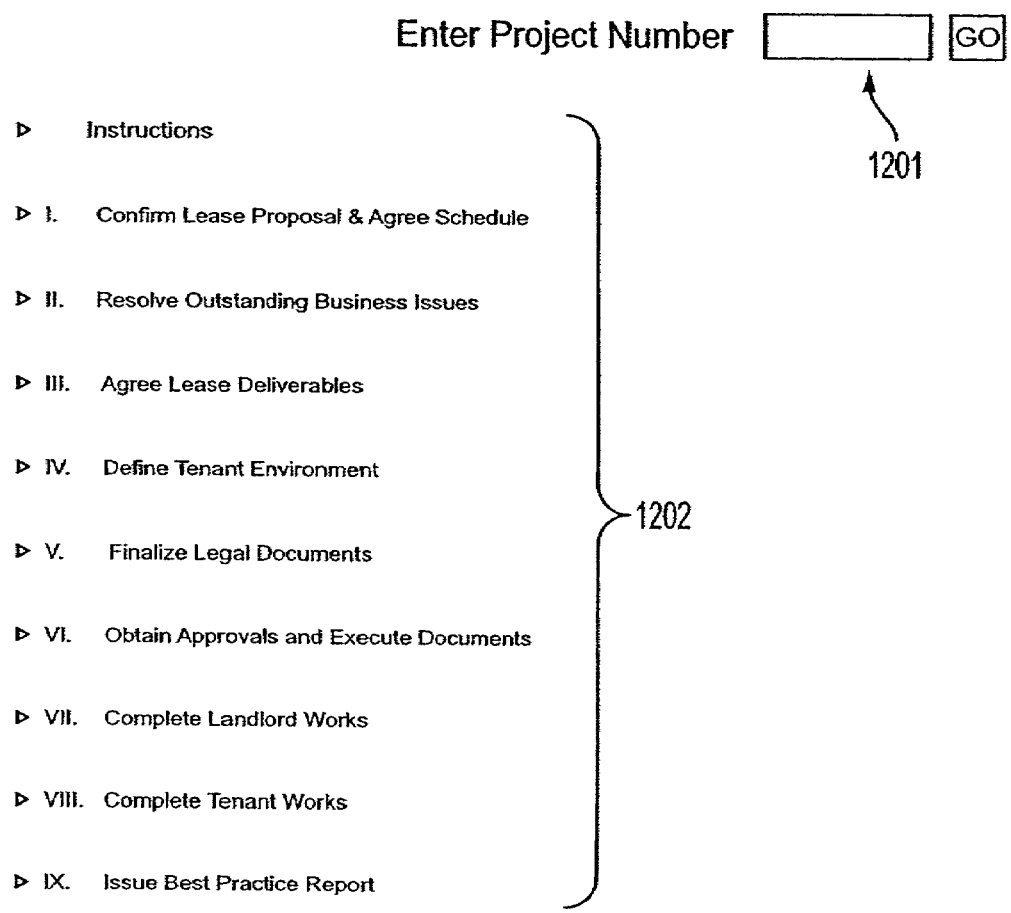
FIG. 12 shows a web-based computer screen presenting top-level choices for each phase of a nine-phase negotiation and execution process.

Turning first to FIG. 12, a top-level project negotiation phase selection page is presented to the user after the user logs in and identifies himself or herself. If a user is beginning a new negotiation, then a separate computer screen (not shown) is displayed to solicit information concerning the parties and the subject of the negotiation. Otherwise, if a previous negotiation has already been started, the user can enter the project number or name into a text box 1201 and the system will retrieve previously stored information regarding the lease. A top-level selection list 1202 contains hyperlinks to web pages corresponding to each of the nine negotiation phases identified on FIG. 12 (and also identified in FIG. 2) and would highlight the current phase that is in negotiation. As an alternative to the hyperlinked display screens described below, each party can fill out a "short form" lease proposal of a type shown in FIG. 16, and the computer can identify any differences between the choices selected by the two parties and focus on those areas of disagreement.

Although the user can jump directly to any negotiation phase, it is contemplated that each user will progress sequentially through the phases, and that users will be prevented from jumping ahead to later phases until agreement has been reached on lease provisions in each phase. Assuming that the user has not previously negotiated any of the lease provisions, the user would click on the first phase (Confirm Lease Proposal and Agree Schedule), which would cause the computer to display a screen such as the one shown in FIG. 13.

Figure 3:
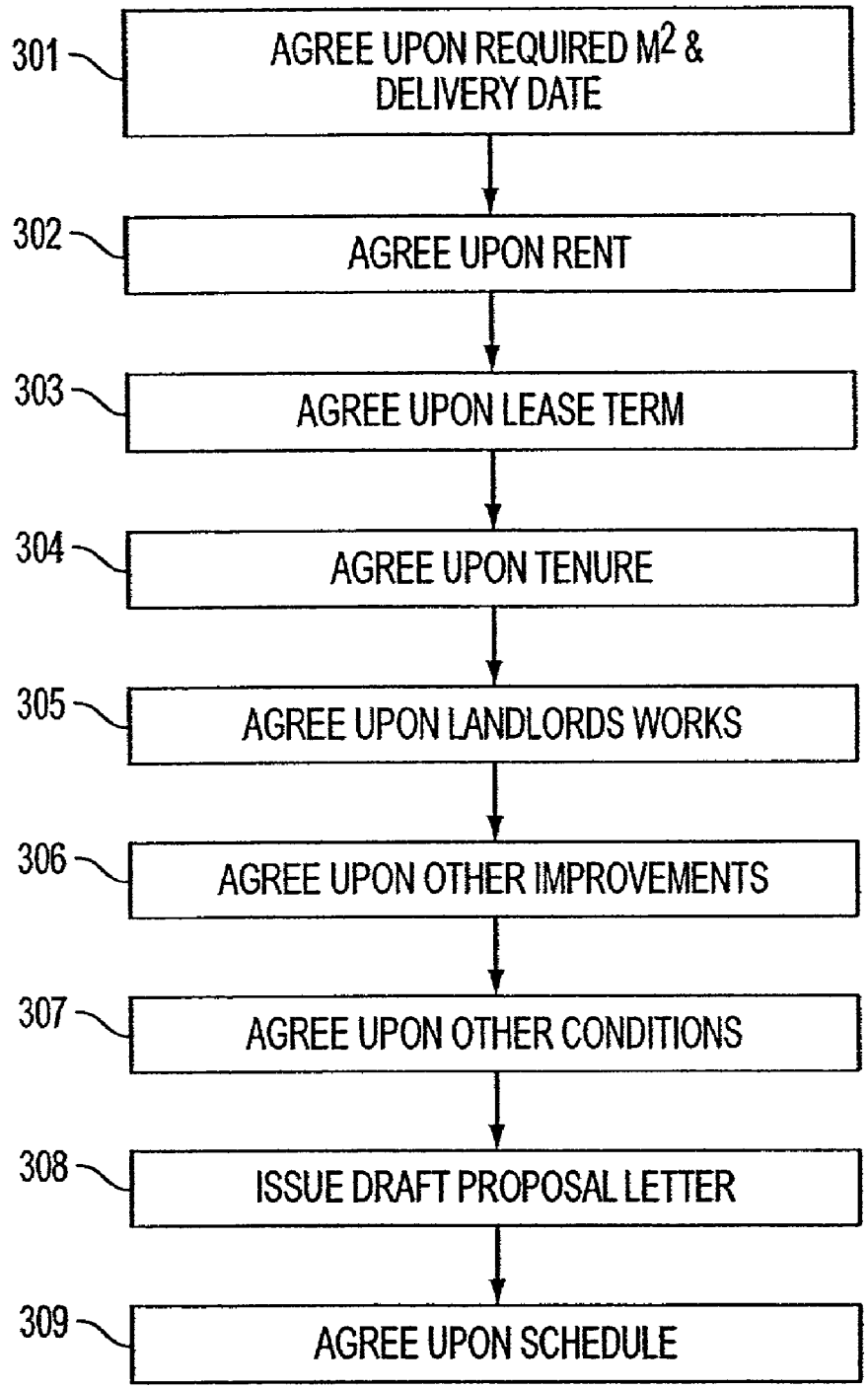
FIG. 3 shows additional details of the first phase.
Figure 13:
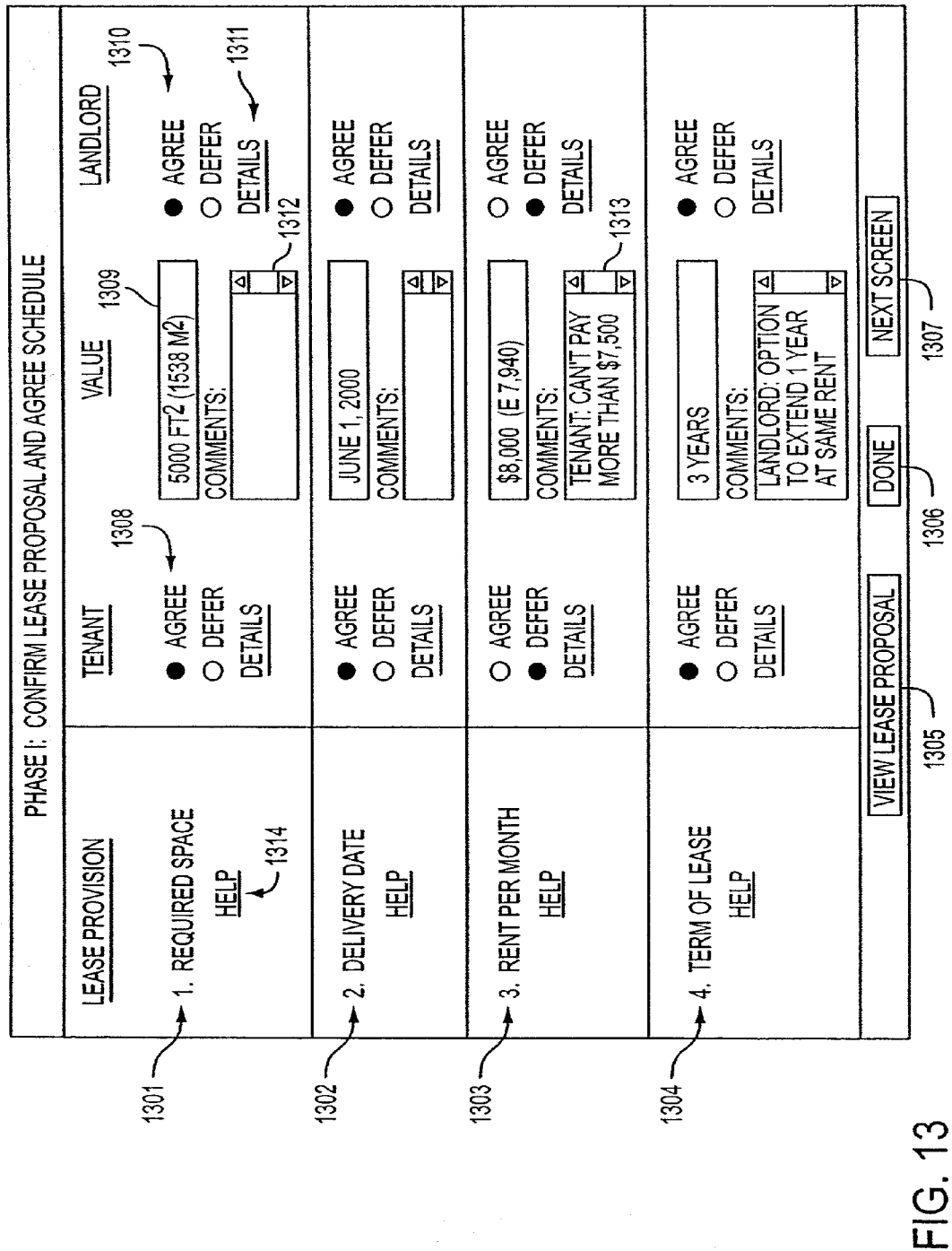
FIG. 13 shows a web-based computer screen in which a prospective tenant and landlord select predefined choices for lease provisions in a first phase.

FIG. 13 shows a web-based computer screen in which a tenant and landlord select predefined choices for lease provisions according to a first negotiation phase. This figure will be explained with reference to FIG. 3, which shows computer-implemented steps that can be used to negotiate between parties during a first phase of a lease negotiation. The steps need not be executed in sequential order as illustrated in FIG. 3. For the sake of simplicity, only four lease provisions are shown in FIG. 13 even though FIG. 3 shows 9 separate provisions. It should be understood that the illustrated lease provisions are by no means exhaustive or exclusive.

In general, for each negotiation phase the parties are presented with a set of provisions related to the lease or leased premises, and a set of choices (e.g., AGREE or DEFER) for taking action on each provision. For certain lease provisions, the parties must not only indicate agreement, but must agree on a specific value or values (e.g., the amount of rent to be charged). In some cases, agreement cannot be reached without negotiating lower-level details. In those cases, the computer-implemented method permits the parties to jump to the lower-level decision-making process before committing to an AGREE or DEFER at the higher level of the negotiation phase. Where a lease provision is deferred, the provision can be negotiated during a later phase by selecting choices other than AGREE or DEFER (e.g., resolution protocol actions such as user forum, LSP, or mediation).

As shown in steps 301 through 309 of FIG. 3, each party is asked to agree upon certain lease provisions (and, where appropriate, to specify certain information such as rental price). Although these steps are shown as sequential in FIG. 3, each user could of course select the choices and enter information in an order different from that shown. In one embodiment, however, a user is prevented from advancing to the next phase of negotiation until all provisions are either agreed to by both parties or any areas of disagreement are indicated as being deferred.

As shown in FIG. 13, four different lease provisions 1301 through 1304 are arranged on the left side of the computer screen. A HELP linkage 1314 can be provided for each lease provision to explain common lease provisions and to answer frequently asked questions. The right side of the screen in FIG. 13 is divided into a tenant portion, a landlord portion, and a middle portion in which either party can enter information. In general, it is anticipated that when the tenant logs into the system, the tenant will only be able to select or modify choices listed under TENANT and values in the middle portion of the screen. Conversely, the landlord can only select or modify choices listed under LANDLORD and the values in the middle portion of the screen. Each party specifies one or more values in the middle portion of the screen, optionally indicates comments in one or more comment boxes 1312, and clicks a DONE button 1306 to signify that they have completed their responses for each negotiation phase.

In general, each tenant and landlord must select either AGREE or DEFER for each lease provision. Before selecting a choice for a particular lease provision, the party can "drill down" to a lower-level decision-making process by clicking on an associated DETAILS hyperlink 1311, which would bring up a page such as that shown in FIG. 14. Suppose, as shown in FIG. 13, that both parties have agreed to a required space provision of 5000 square feet (automatically converted into square meters by the computer); a delivery date of Jun. 1, 2000; and a lease term of 3 years. Suppose further that the parties have agreed to defer agreement on the amount of rent (although a proposed rent amount is listed, and the tenant has added a comment to comment box 1313). As to the landlord's works (not explicitly shown in FIG. 13), the parties do not have enough information to agree or defer to the next step. In that case, one or both of the parties could click on the associated DETAILS link, which would bring up the screen shown in FIG. 14.

Turning to FIG. 14, the parties are presented with a set of lower-level decisions concerning the landlord's works lease provision. As shown in FIG. 14, agreement on a landlord's works includes deciding whether the premises are to be delivered on a "turnkey" basis 1401; "as-is" condition 1402; a definition of the landlord's works 1403; and agreement on the landlord's and tenant's contribution to the work 1404. A help button (not shown) can be included to explain the decision and provide a reference to local market practice in a particular city.

Some of these sub-provisions require nothing more than an AGREE or DEFER decision (e.g., 1401 and 1402), while others (e.g., 1403 and 1404) require that a value be provided by one or the other party (e.g., elements 1406 and 1407). Each party can select choices as shown in FIG. 14 before selecting DONE and returning to the top-level lease provision screen shown in FIG. 13.

During the negotiation phases, either party can choose to view a draft lease proposal by clicking on VIEW LEASE PROPOSAL button 1305. In response, the computer generates a draft lease proposal incorporating the lease provisions that had so far been agreed to by the parties. One example of this is shown in FIGS. 17A and 17B. As a practical matter, after the lease has been negotiated (e.g., step 206 of FIG. 2), the lease proposal would be superseded by the actual lease.

As shown by the steps in FIG. 3, additional lease provisions including lease term, tenure, landlord works (e.g., "as is" condition or "turnkey" basis), other improvements, other conditions (e.g., parking, operating expenses, termination condition, etc.), and draft schedule can also be agreed to, deferred, or negotiated using the above-described process.

Assuming that both parties have selected either AGREE or DEFER for each lease provision and click DONE, the computer will advance to the next negotiation phase, which will now be explained with reference to FIG. 15. If the parties have not selected either AGREE or DEFER for all lease provisions in the first negotiation phase, then in one variant of the invention they will be prevented from advancing to a later negotiation phase. In certain variations of the invention, however, the parties are allowed to defer lease provisions such as the condition of the premises until successively later phases; at each later phase, the parties are prompted to resolve any outstanding issues.

Figure 4:
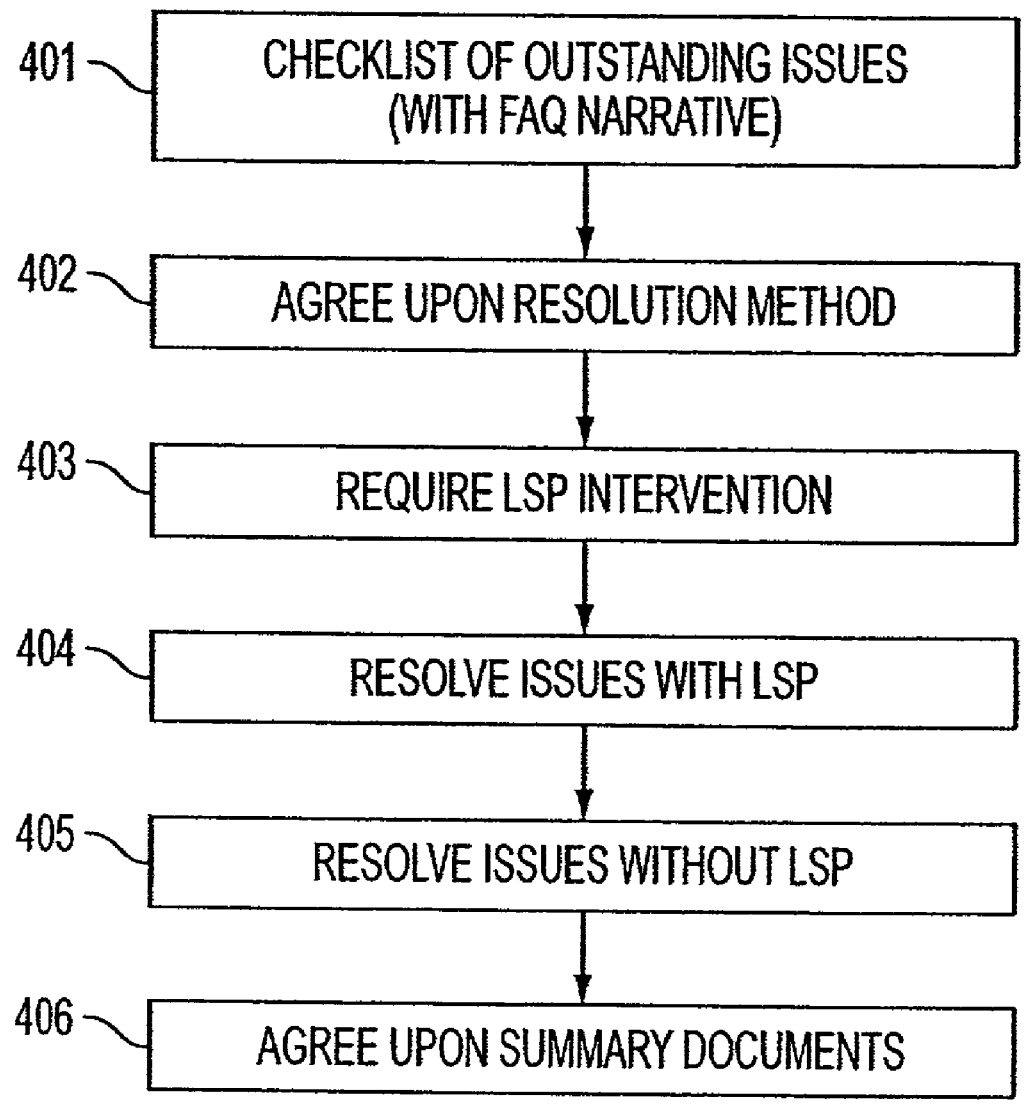
FIG. 4 shows additional details of the second phase.
Figure 15:
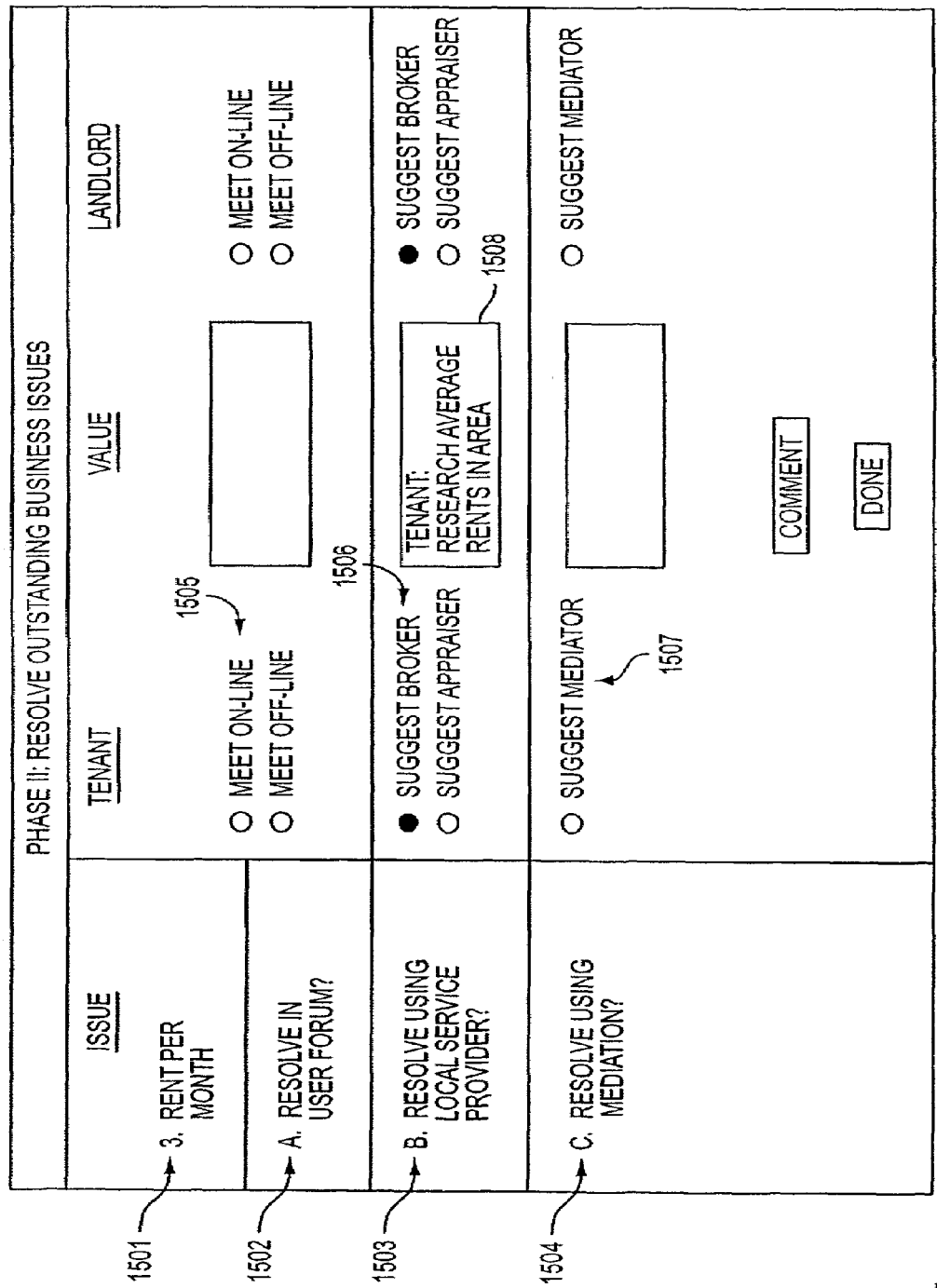
FIG. 15 shows a web-based computer screen in which a prospective tenant and landlord select predefined choices for resolving deferred lease provisions in a second phase.

FIG. 15 shows a computer screen with choices for a second negotiation phase. As shown in FIG. 4, in one variation of the invention the second phase includes steps of presenting a checklist of outstanding issues that were deferred from the first phase, and soliciting inputs from the parties that will allow the parties to reach agreement on the deferred issues using, for example, a local service provider (LSP) or mediator. Because the amount of the rent was deferred from phase one (see FIG. 13, lease provision 1303), this lease provision is again presented to the parties (item 1501 in FIG. 15) with options for resolving the issue. In one variation of the invention, an issue can be resolved directly by the parties, or by involving a third party. The parties may choose for example to resolve the rent issue in a user forum 1502, such as an on-line or off-line meeting (choices 1505). If both parties agreed to such a resolution, the computer would assist in arranging an on-line or off-line meeting (e.g., by asking the parties for available times; accounting for time zone differences, etc). The computer could arrange a chatroom dialogue in an on-line forum or a conference call using a computer-aided program and may include a link through another web site.

Alternatively, the parties may choose to resolve the issue using a local service provider 1503. Two examples of local service providers relevant to the issue of rent might be a real estate broker in the area of the leased property or an appraiser. As indicated in FIG. 15, the parties may agree to hire a broker (choice 1506), and the computer could suggest a broker in the geographic area of the leased property. The parties may further choose whether to hire a separate broker, or to jointly hire a broker to advise both parties as to local practice (not explicitly shown). As indicated in comment box 1508, the tenant has suggested that the broker should research average rents in the leased area to help resolve the issue (see below).

As yet a third option, the parties may agree to resolve the issue through the use of a mediator 1507. In that case, the computer can again suggest one or more mediators familiar with the type of lease transaction and convenient to one or both of the parties. Additional computer screens (not shown) can be presented to the user to obtain information necessary to consummate the third party relationship. The computer would issue a request for proposals for the required assistance.

The negotiation options presented by the computer can be tailored to the specific lease provision that is the subject of dispute. For example, if the parties are stuck on the subject of the condition of the leased property (e.g., the type of network communication system that will be provided), the computer would suggest a service provider familiar with telecommunication systems, such as an engineering consultant or a company that specializes in providing networks. As another example, if the parties have not reached agreement on a floor plan, the parties could enlist the services of an architect or interior designer, again with computer-generated requests for proposals with the required scope of services (see, e.g., FIGS. 19A and 19B).

If the parties agree that a local service provider is to be hired, the computer system can recommend one or more providers based on the geographic area of the lease (see FIG. 1, vendor database 106). Alternatively, a party may individually choose to hire a local service provider without the assent of the other party (e.g., an architect), and the system can recommend one or more service providers in the same manner. In one embodiment, the system generates a preformatted request for services using information obtained during the negotiations (e.g., name/address of the tenant, information concerning the leased space, etc.) and transmits the request to one or more vendors in order to receive a quote for services. The request can be transmitted via e-mail or fax by the computer system, and each vendor can submit a bid or response to the party or parties requesting the services. The computer can receive responses in a standardized format and transmit to the parties a comparison of the proposals if more than one vendor were selected. In one variation, vendor database 106 includes information concerning ratings or quality marks for specific vendors based on prior experience with other parties. Consequently, the parties can make an informed decision regarding potential third-party service providers.

Resolving issues using an LSP can be done through on-line web-based conference calls, e-mail, telephone calls, and/or in-person meetings. Resolving issues without the use of an LSP can be done using the same techniques.

After the issues are resolved by the parties, the parties enter the resolved information into the computer (using, for example, the computer form of the type shown in FIG. 13) and the computer stores the revised negotiation information into the lease database. Additionally, the computer can "lock in" the agreed items to prevent modification by either party. The result of phase two is a revised lease proposal with the agreed changes, which the computer generates upon command based on the revised negotiation information.

Once the parties have successfully completed the first and second phases of the negotiation, the computer system will allow them to proceed to the third negotiation phase. It should be understood that additional computer screens corresponding to the steps in FIG. 5 and the succeeding negotiation phases can be provided, although none are illustrated herein.

The third negotiation phase (agreement on lease deliverables) will be described with reference to FIG. 5. It will be appreciated that although some of the steps shown in FIGS. 5 through appear to repeat some of the lease provisions that were the subject of an earlier negotiation phase, in practical terms any lease provision that was the subject of complete agreement in an earlier phase would be removed from later negotiation phases.

Figure 5:
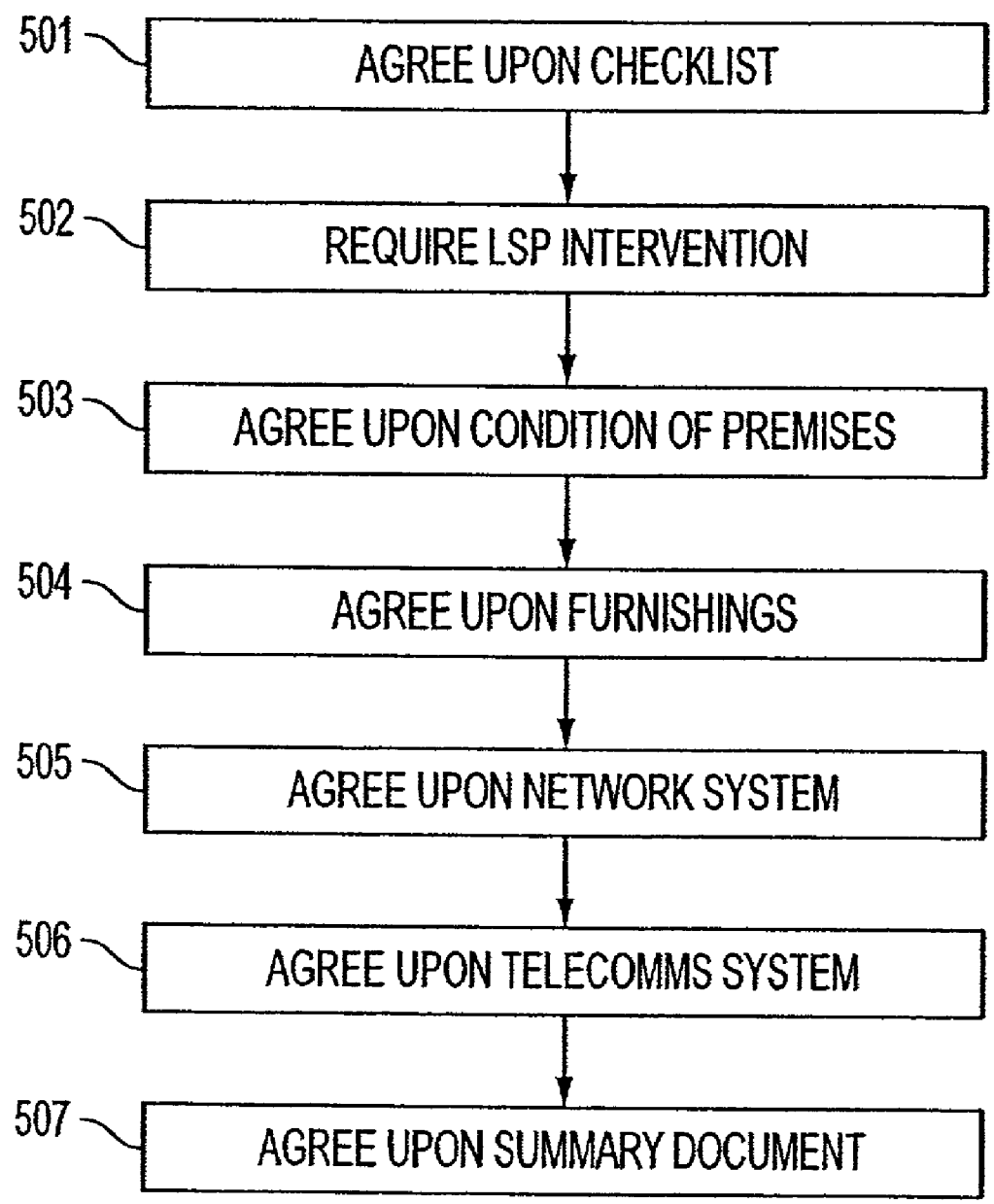
FIG. 5 shows additional details of the third phase.

Beginning with FIG. 5, in step 501 the parties agree upon a checklist (e.g., condition of the premises, furnishings, network systems, etc.). If these were already agreed to in an earlier negotiation phase, the computer would delete them from a later phase. In step 502, the parties agree upon the condition of the premises, indicating whether the premises will be delivered "as is," or with turnkey modifications or with other modifications. In step 503, if LSP intervention is needed, it is selected as described above. In step 504, the parties agree upon the furnishings (e.g., cafeteria equipment, furniture, etc.). In step 505, the parties agree upon a network system, and in step 506 they agree on a telecommunications system (using if necessary an LSP as per step 503). In step 507, the parties agree upon a summary document including the agreed deliverables and a completed lease proposal including schedule.

In one variation of the invention, a schedule calculator (FIG. 1A, element 111) calculates a proposed schedule corresponding to milestones during the negotiation and execution phase, based on average actual lengths of time stored in a database. In one variation, the lengths of time stored in the database are based on or derived from previously negotiated contracts (i.e., real-world practice is used to project future schedules). For example, if over the course of five different negotiated leases the average amount of time needed to go from generating a draft lease to moving into the leased property is two months, the scheduler would use that value to schedule such a milestone two months before the lease move-in date. The computer displays and prints a lease negotiation and execution schedule based on information provided by the parties and from databases of previously negotiated leases. FIG. 18 shows a computer-generated schedule for each phase of a nine-phase lease negotiation and execution process.

Figure 6:
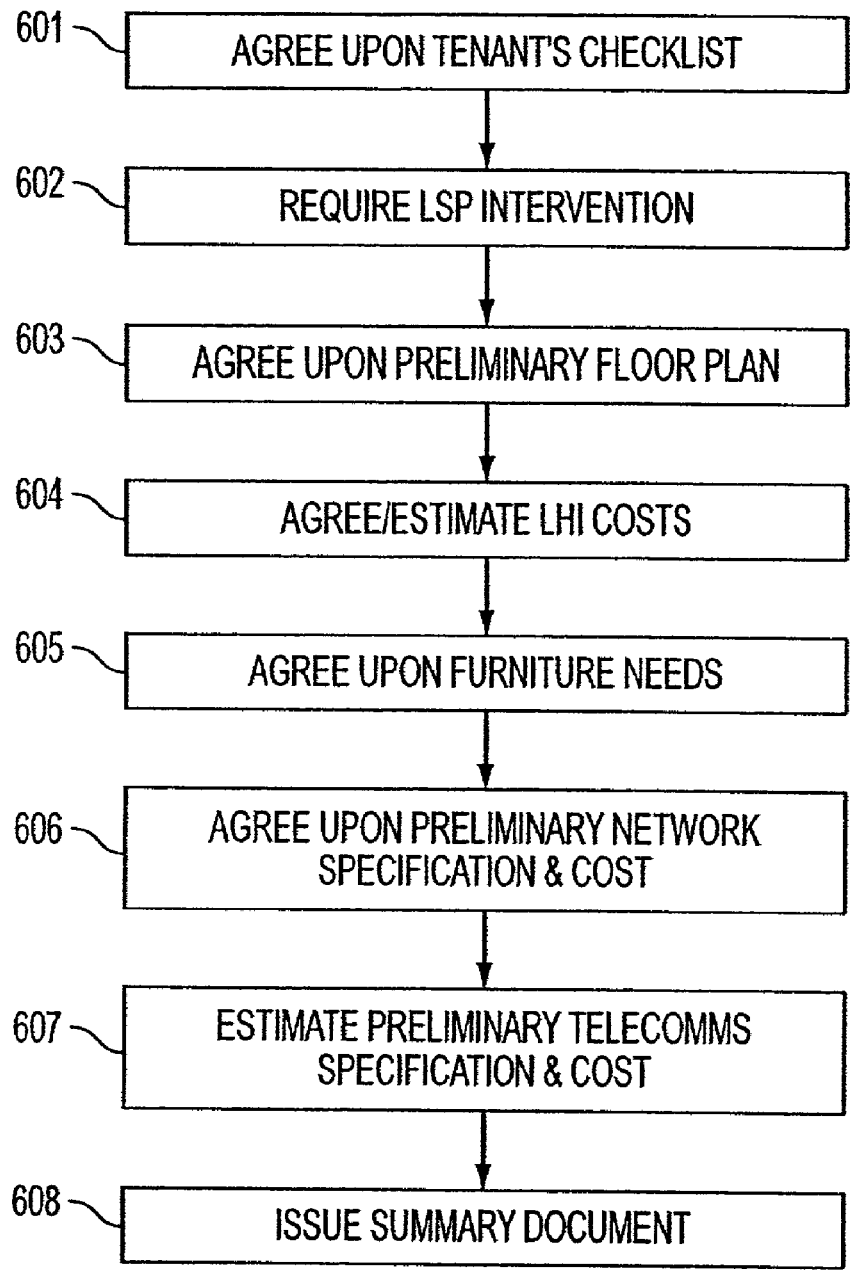
FIG. 6 shows additional details of the fourth phase.

The fourth phase (define tenant environment) will be explained with reference to FIG. 6. In step 601, the parties (including the tenant and its local service providers) agree upon a tenant's checklist. This can include an agreement on a floor plan, furniture needs and costs, and LHI (leasehold improvement) cost. Steps 602 through 607 are similar in nature to the other steps already discussed (i.e., the parties either agree or defer agreement on each item, and can resolve areas of disagreement using LSPs or other options). The result of negotiation in phase four is the issuance of a summary document including a checklist of outstanding tenant environment needs; a modified lease proposal; and a revised schedule (if necessary).

Figure 7:
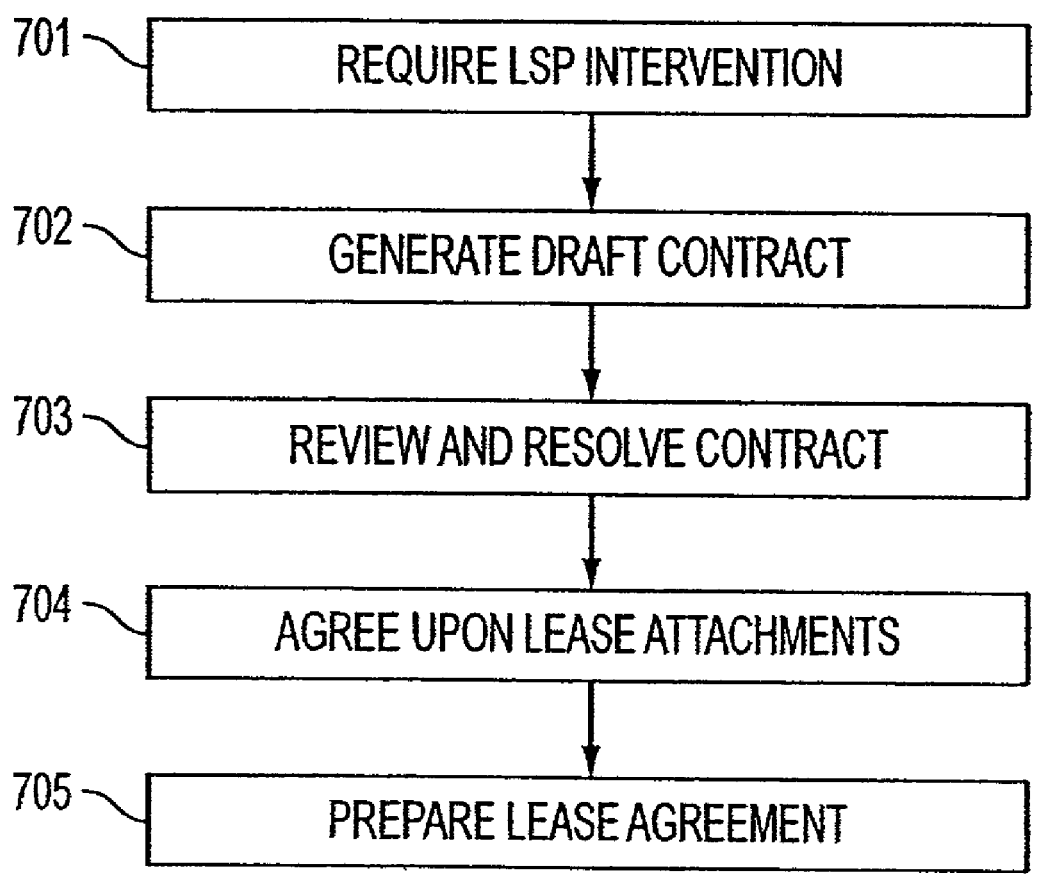
FIG. 7 shows additional details of the fifth phase.

The fifth phase (agreement on legal documents) will be described with reference to FIG. 7. In step 701, the parties agree to require intervention by LSPs (e.g., lawyers) if necessary. In step 702, a draft contract (lease) is generated by the computer on the basis of the negotiated information that was "locked in" by agreement of the parties. This step can be done using a document template populated with information from lease database 104. In step 703, the parties review and resolve the contract, including mediation if necessary. In step 704, the parties agree upon lease attachments such as a detailed description of office space, final plans and specifications. In step 705, a lease agreement is prepared. The result of the fifth phase is a lease that the parties agree on (but which has not yet been executed).

Figure 8:
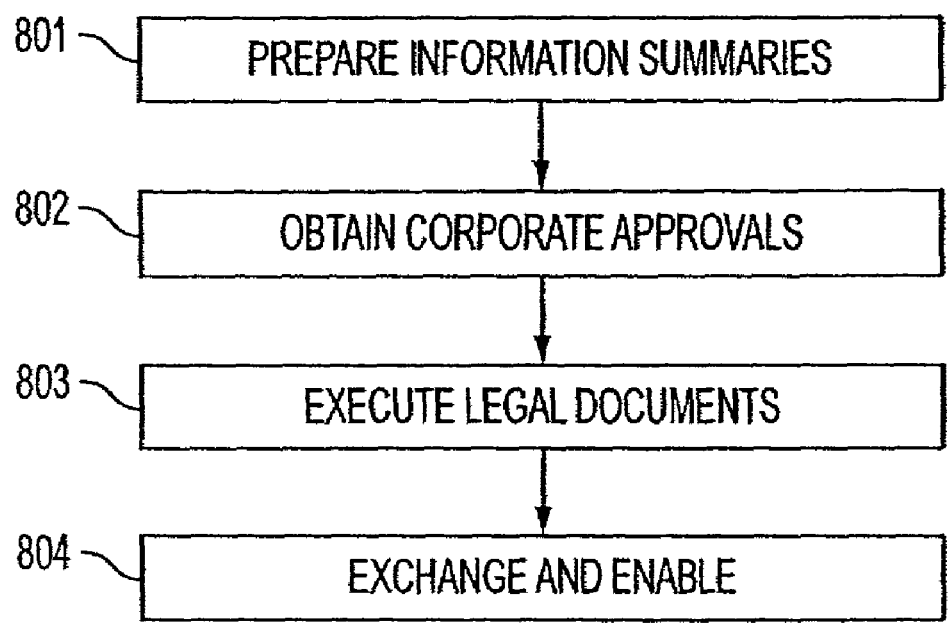
FIG. 8 shows additional details of the sixth phase.

The sixth phase (obtain approvals and execute documents) will be explained with reference to FIG. 8. In step 801, information summaries are prepared. If a corporate approval summary is required, a standard corporate approvals form is generated using information from the lease database. If a financial analysis is required, a standard financial analysis form is generated. In step 802, corporate approvals are obtained by each party. This includes steps of submitting the forms and information for internal approvals, obtaining signatures of local subsidiaries if required; and obtaining management signatures on the approval forms. In step 803, the legal documents are executed. This may include steps of identifying authorized signatories; transmitting original signature documents by e-mail, fax or express mail, and obtaining the actual signatures. In step 804, the parties exchange documents, pay required deposits, and exchange keys or other entrance mechanisms (security codes, etc.) The outcome of this phase is that all legal documents are executed and access is granted to the premises.

Figure 9:
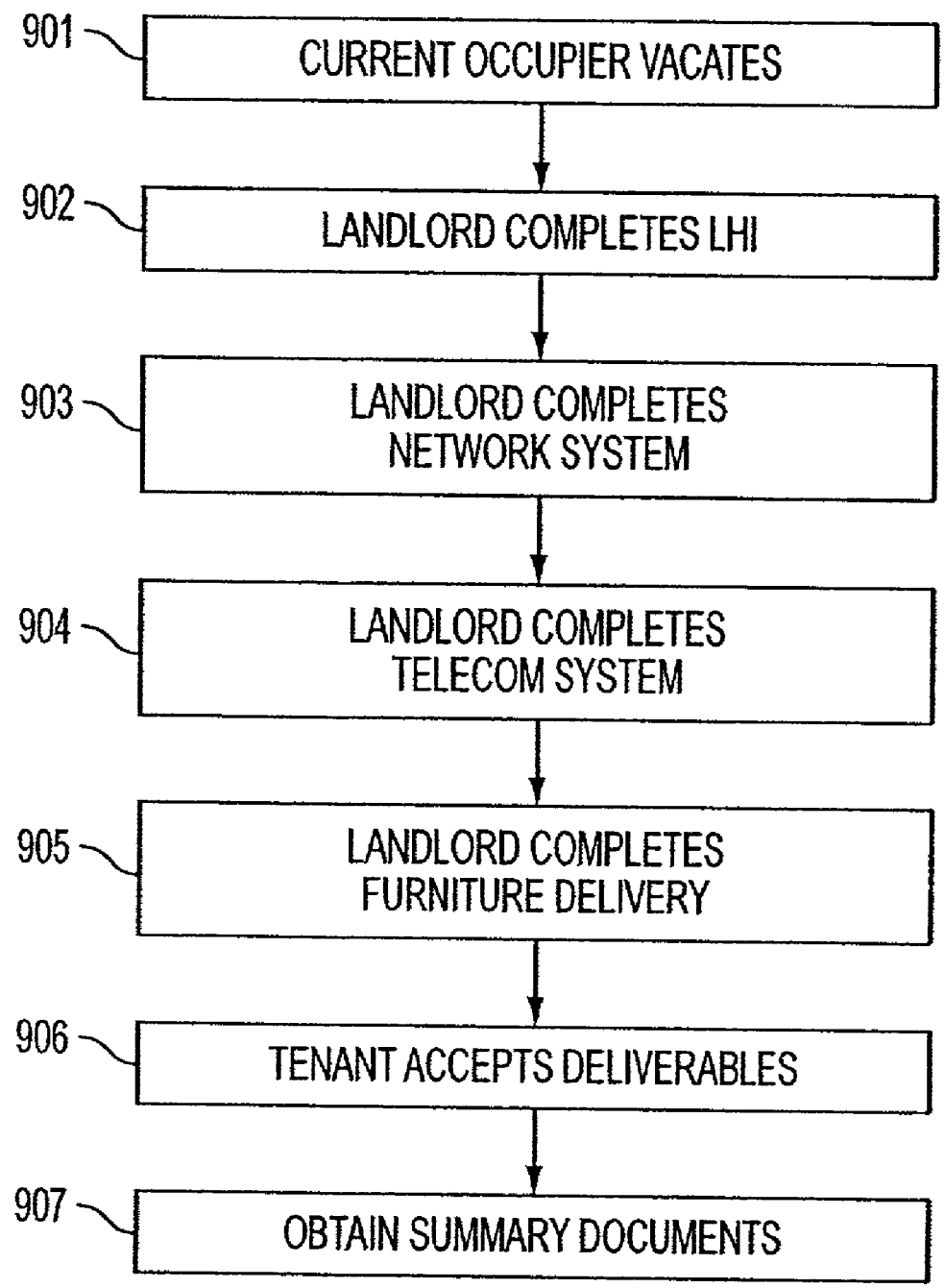
FIG. 9 shows additional details of the seventh phase.

The seventh phase (complete lease deliverables) will be explained with reference to FIG. 9. In step 901, the current occupier vacates the premises (if it has not already done so). In step 902, the landlord completes the leasehold investment required under the lease. In steps 903 and 904, the network and telecommunication systems are delivered in accordance with the lease. In step 905, the furniture is delivered and accepted. Any works for which the landlord is not responsible would be eliminated as decisions in this phase.

In step 906, the tenant formally accepts all of the above deliverables (to the extent that these were not accepted in the preceding steps); this may include steps of inspecting the premises, rectifying defects or variances, and providing a summary of delivered items.

Figure 10:
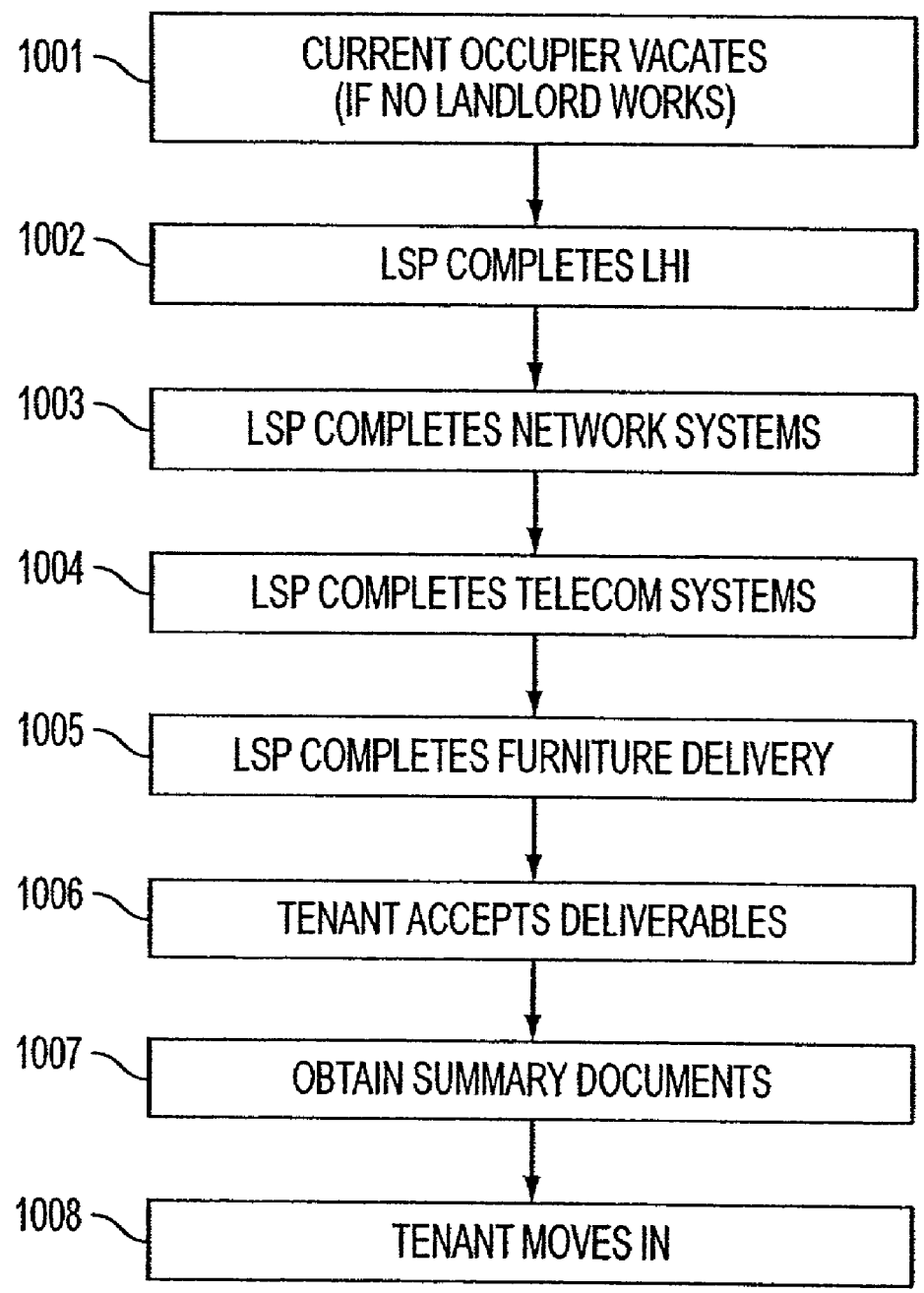
FIG. 10 shows additional details of the eighth phase.

The eighth phase (complete tenant works) will be explained with reference to FIG. 10. The steps shown in FIG. 10 relate to works that the tenant is completing without assistance of the landlord. As such, the decisions in this phase involve only the tenant and its LSPs (although, in practice, the tenant may require the landlord's cooperation to resolve issues related to installation of tenant systems in the premises). Any steps that are completed by the landlord on behalf of the tenant in phase seven would be automatically eliminated from phase eight. Once all of the tenant's works are completed, the tenant would move into the new premises.

Figure 11:
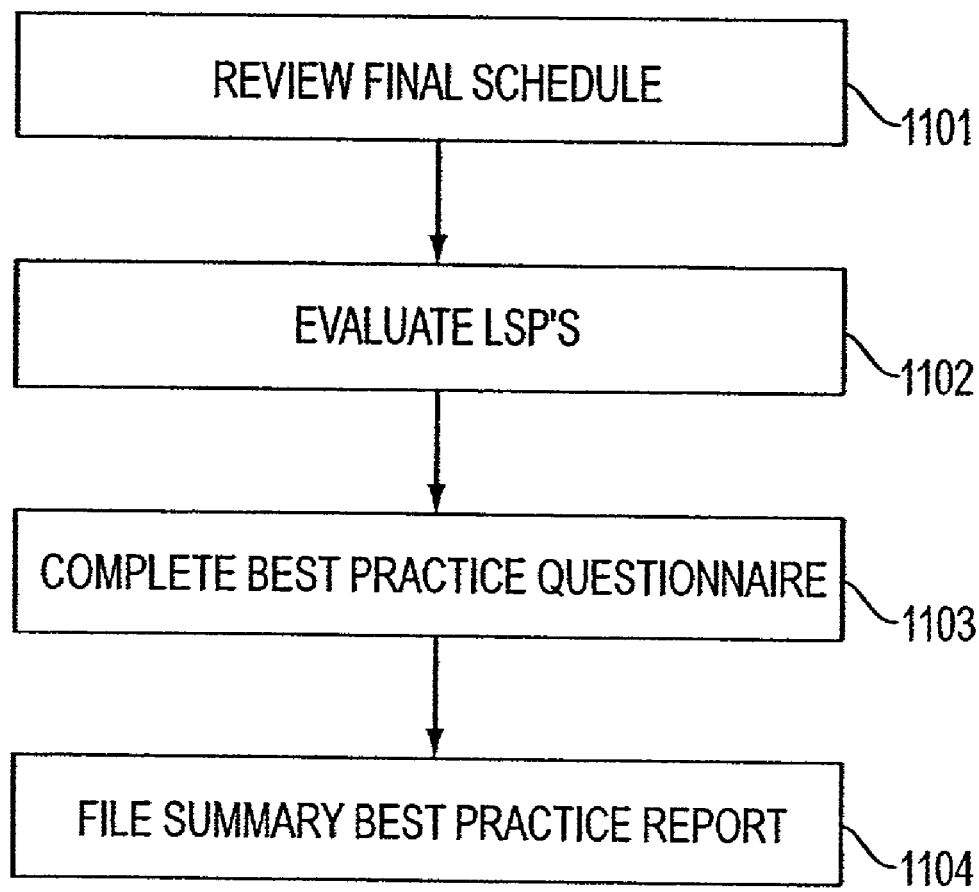
FIG. 11 shows additional details of the ninth phase.

The ninth phase (issue best practice report) will be explained with reference to FIG. 11. In this phase, the parties review the negotiation process for evaluation purposes, particularly with a view to building a database that can be used by parties in future negotiations. In step 1101, the final schedule is reviewed and accepted with comments. The final schedule will show the variation between the initial and actual schedules, and the computer will prompt the parties to indicate the reasons for the variances. In step 1102, the parties evaluate LSPs that were used during the negotiation process (e.g., mediators, architects, lawyers), and the evaluation information is stored in a database. In step 1103, a best practice questionnaire is completed by each party. The questionnaire may include questions soliciting successes; problem areas identifying locality-specific difficulties encountered during the process (e.g., difficulties in completing legal documents in London); and improvement suggestions. The results are stored in a computer database. Finally, in step 1104 a best practice report is generated and stored in a database. In one variation, the best practice report is generated using a document template that extracts answers to questions and information from the lease negotiation process. The report can be viewed by parties to a future negotiation to help in a transaction.

FIG. 16 shows a computer-generated lease proposal that can be filled in by one or both of the parties. In one variation of the invention, if the parties have already begun discussions, they could use a form such as that shown in FIG. 16 to enter information regarding the proposal without having to go through a more detailed agree/defer process illustrated in FIGS. 13 through 15.

Continuation-in-part Improvements

Although the above-described structured negotiation process and system has wide applicability to various types of contracts and real estate transactions including leases, sales, and others, the following sets forth in further detail various improvements to the principles outlined above. These improvements concern the following features:

(1) rules-based agreement on negotiator-supplied terms (response and dialogue box);
(2) delegation to transaction team members or service providers;
(3) summary reports with link to messaging system;
(4) dual messaging system;
(5) customized negotiation process; and
(6) sale-specific features.

Each of these features is explained in more detail below.

1. Rules-based Agreement on Negotiator-supplied Terms

The system described above allows each party to the negotiation to enter ancillary information (e.g., a proposed delivery date or monthly rent) that is then evaluated by the computer to identify a discrepancy (e.g., if each party has proposed a different value) and to propose a solution (e.g., the computer can propose splitting the difference between two numerical values). Additionally, the system described above allows each party to "write over" the other party's proposed ancillary information, wherein the computer flags any overridden values and alerts the other party of the changed value. The system described above also allows each party to enter a value and the computer will recognize agreement if the values entered by both parties are the same.

In some situations, values entered by negotiators may not be simple numeric quantities (e.g., a monthly rent or a sale price). Some contract terms may involve a paragraph or two of legal text explaining the parties' understanding of a particular contract term (e.g., what it means to have "fully functioning plumbing"), or may involve other more complicated terms. Some of these provisions may need to be negotiated over a period of time, such that it is not practical for a party to merely enter a number or type in a sentence. In such situations, a more elaborate dialogue box approach may be warranted.

According to one inventive improvement, each party to the negotiation is provided with a separate dialogue box into which certain proposed contract terms can be provided. As shown in FIG. 13A, a web-based computer screen is presented to the parties to a transaction. For each contract provision, each party is provided with an agree/defer mechanism (e.g., selection items 1308 and 1310); a response box (1357 and 1309) and a dialogue box (1356 and 1350). According to this variation of the invention, each party controls its own agree/defer selection and its own response and dialogue box, but is prevented by the computer from typing into those portions of the other party's display areas. However, each party can see what the other party has typed into these respective areas, such that each party is aware of the other's negotiating position.

In general, each party should respond to each decision by (a) making an entry in the response box but not in the dialogue box; or (b) making an entry in the response box and an entry in the dialogue box; or (c) making an entry in the dialogue box but not in the response box, and then (subject to the restrictions below) selecting either Agree or Defer.

In one variation of the invention, the system will accept an Agree response from both parties, and lock in a decision, only if the parties respond as per alternative (a) or (b) above, and provided that entries in the response box for both parties, and entries in the dialogue box for both parties, are identical. If one party wishes to accept the comment in the other party's dialogue box, they may simply enter the word "accept" in their dialogue box, and the system will assume that the comments are identical. The computer will not accept an "Agree" response under alternative (c).

The system will accept a Defer response from both parties under alternative (a), (b) or (c) above. It is not necessary for the entries in either the response box or the dialogue box to be identical. If one party enters "Agree" and the other party enters "Defer", the system will assume that no decision has been made, and that this phase in the process is therefore not complete. The system will prompt the parties to reach an Agree or Defer decision. If one party makes an entry in an Agree/Defer box and the other party does not, the system will prompt the other party to make an entry.

As shown in FIG. 13A, the landlord has entered 5000 square feet as the leased space in response box 1309, and has indicated in dialogue box 1350 that the space measurements exclude closet space. The prospective tenant has entered "accept" into response box 1357 and "accept" into dialogue box 1356, and has selected Agree. Consequently, the rules-based computer processing would lock in this lease provision based on agreement of the parties. As another example, if the tenant wrote "usable space" in the dialogue box corresponding to the leased space, but the landlord wrote "rentable space" into the landlord's corresponding dialogue box, the computer would not allow the parties to select Agree. In another variation, however, the computer would flag the discrepancy and generate a report indicating that the parties had not agreed on the provision at issue.

Also as shown in FIG. 13A, the landlord has indicated in dialogue box 1351 that a particular plan of the space will be used, but the tenant has indicated in selection 1353 that this decision is to be deferred. Therefore, the rules-based computer processing would defer this lease provision based on the tenant's decision to defer or, in one variation, generate a message to the landlord asking if they wished to also defer this decision or, in a further variation, ask the tenant if they wished to accept the landlord's comment. When the parties have entered differing "Agree"/"Defer" decisions, the system can prompt the parties to have matching decisions. For example, if party A entered "Agree" and party B entered "Defer", the system would prompt B with a message asking B to review its decision to make sure it is correct. If there were no change to B's decision, the system would deliver a message to party A advising that there is a discrepancy, and asking A to review its response. If party A makes no changes, the system would then prompt party B again, and so on until the decisions match. There are obviously many other rules and approaches that could be used to carry out the inventive principles.

Both parties have indicated in dialogue boxes 1354 and 1355 that an occupancy date of Dec. 1, 2001 is to be used, and have indicated agreement on this provision. The computer-implemented rules would detect that both parties had entered the same date in these dialogue boxes, and would lock in this lease provision accordingly.

In another variation, the parties could agree at the start of the process to exclude any dialogue box comments as part of the decision making process. In yet another variation, the parties could be prompted by the computer as to whether they would accept the Agree choice without taking into account the dialogue box comments. Many other variations are of course possible.

In a further variation, the system could note on a higher level screen all decisions reached by the parties on a web-based computer screen such as that shown on FIG. 13A, such that the parties do not do not need to record these summary agreements themselves. For example, if one lease provision includes several lower-level decisions that are made using a lower-level screen made up of various sub-decisions, the computer can be programmed to recognize that agreement has been reached on all of the lower-level sub-decisions and reflect a "rolled-up" agreement at a higher-level screen. This would avoid the need for the parties to explicitly indicate that agreement had been reached on all lower-level details pertaining to a particular lease provision or phase of the negotiation process.

2. Delegation to Transaction Team or Service Provider

According to another aspect of the invention, negotiators to a transaction can designate members of their transaction teams or service providers, such that different aspects of a negotiation can be handled by different authorized entities. According to this aspect of the invention, the parties can identify a person responsible for each decision and, optionally, the role played by that person (e.g., architect, broker, attorney, real estate agent). These persons may be employed by the parties (e.g., a user group representative or project manager for a tenant), or they may be an external service provider (e.g., a broker for the landlord). By nominating and registering these persons, they can (subject to permissions granted by the parties) participate directly in the decision-making process; can print out reports; and can send and receive messages among other members of the negotiating team.

In the context of a real estate lease negotiation, the prospective landlord and tenant, who are identified at the beginning of the transaction, have the capability to designate and modify members of the transaction team. Members can be designated based on different phases of the negotiation (e.g., one person handles Phase I negotiations, whereas a different person handles Phase II negotiations), or they can be designated based on particular functions (e.g., an architect could be designated to handle office space planning, whereas a broker could be designated to handle space and price requirements or they can be designated to handle specific decisions within a particular phase).

FIG. 20 shows a web-based computer screen that can be used to allow each contract negotiator to designate members of the negotiating team. As shown in FIG. 20, the tenant has designated a company (Realtor Plus) 2001 and a user (Jack Realtor) 2002 to handle the tenant's negotiation of the Agree Lease Proposal and Schedule terms of the negotiation. Additionally, the role played by this person is indicated as real estate agent (see box 2003). Similarly, the landlord has assigned a different company and person to handle negotiations on its behalf. Based on these designations, the system would permit Jack Realtor to log into the system and negotiate this specific lease provision on behalf of the tenant, and would permit Bob Worker to log into the system and negotiate this specific lease provision on behalf of the landlord. The roles assigned to each person can be selected from a pull-down menu and are used by the system (as described below) to allow team members to communicate based on roles.

The tenant has similarly designated Steve Smart of Brokers Plus to negotiate outstanding business issues, as indicated at 2004 and 2005 in FIG. 20. This person's role is contract manager, as indicated at 2006. The landlord, however, has assigned himself to be responsible for this phase. Finally, the tenant has designated Susan Smith of Office Plus to negotiate the landlord lease deliverables on behalf of the tenant.

Based on the designations made by each party (e.g., tenant and landlord), different team members would be permitted to log into the system and negotiate only those contract provisions for which they had been given authorization. Access could be restricted to other parts of the system (e.g., reviewing bids from competing service providers or other proprietary information) where the service provider does not need detailed information to complete its assigned tasks.

In a further variation, a party may delegate partial decision making authority to a service provider by permitting this person to utilize certain preformatted and/or dialogue boxes (such as shown in FIG. 13A) while reserving for itself the making of the Agree/Defer choices to finalize each decision. The format (such as indicated in FIG. 13A) for this joint decision-making process would permit the party to quickly identify these choices. For example, suppose that Company A has a substantial leased real estate portfolio and a small in-house professional staff. It delegates much of the transaction work to third party providers such as brokers and project managers. However, on larger transactions management wishes the in-house professionals to be directly involved in the negotiations. To satisfy this demand, the system would permit the party to assign service providers control over the middle portion of certain screens (i.e., the pre-formatted and non-preformatted fields and dialogue boxes). Once the provider had completed its negotiations, the party would simply follow down the column and click "agree" or "defer" to each provision, at which point the computer could lock-in decisions if the other party (using the same dual approach or a different approach) had done likewise.

In another variation of the above-described principles, decision-making can be allocated between a transaction party and the party's service provider by decision-making level. This permits a party to delegate the authority for negotiating detailed terms and conditions on lower-level screens through use of the preformatted choices and dialogue boxes, but to reserve the final agree/defer decision to the party itself on a higher level screen such as the screen displayed in FIG. 13.

In another variation, a general override provision can be included to allow a party to change any decision that his or her service provider has made (thus in some cases "unlocking" decisions).

3. Summary Reports with link to Messaging System

A third improvement to the system outlined above is the ability to provide a summary report with a linkage to a messaging system (e.g., an e-mail service) for each transaction party. As shown in FIG. 21, a plurality of transactions are shown in summary form. Pertinent details from each transaction or lease are listed on a single line, and a current contact 2101 is shown in hyperlink form. The current contact may be the tenant, landlord, or a person who is designated to be responsible for this phase of the transaction. A user of the system can click on current contact 2101 and be presented with a message transmission screen, such as that shown in FIG. 22. Messages can be transmitted using any of various commercially available e-mail programs, or using custom-developed software.

Figure 22:
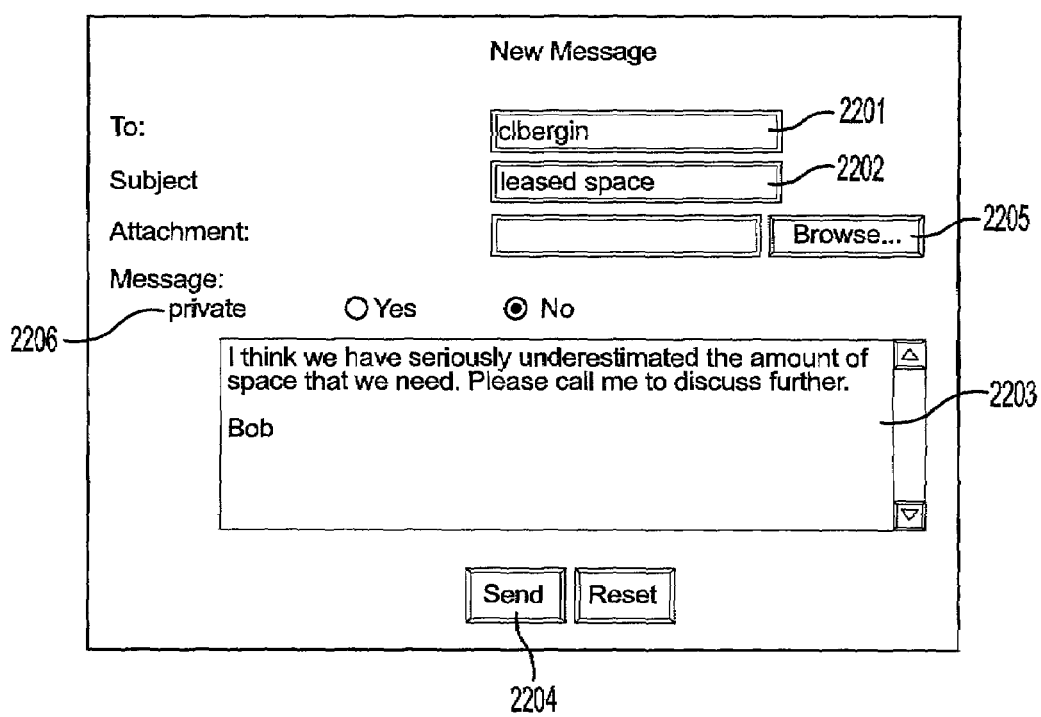
FIG. 22 shows a message transmission screen for sending messages to a current contact associated with a lease.

As shown in FIG. 22, the message transmission screen is pre-populated with the name of the current contact for the landlord or tenant. The user of the system (which may comprise one of the individuals designated to act on behalf of one of the parties or company executives with responsibility for real estate transactions who are registered) can send a message to the current contact 2201 concerning a subject 2202 and a message 2203. An attachment 2205 can be provided (e.g., a draft of an office layout or other document) and sent 2204 to the current contact. This feature allows users to quickly and easily identify the current contact along with pertinent details of a particular lease transaction, which especially benefits busy executives in need of a timely response to questions.

Figure 23:
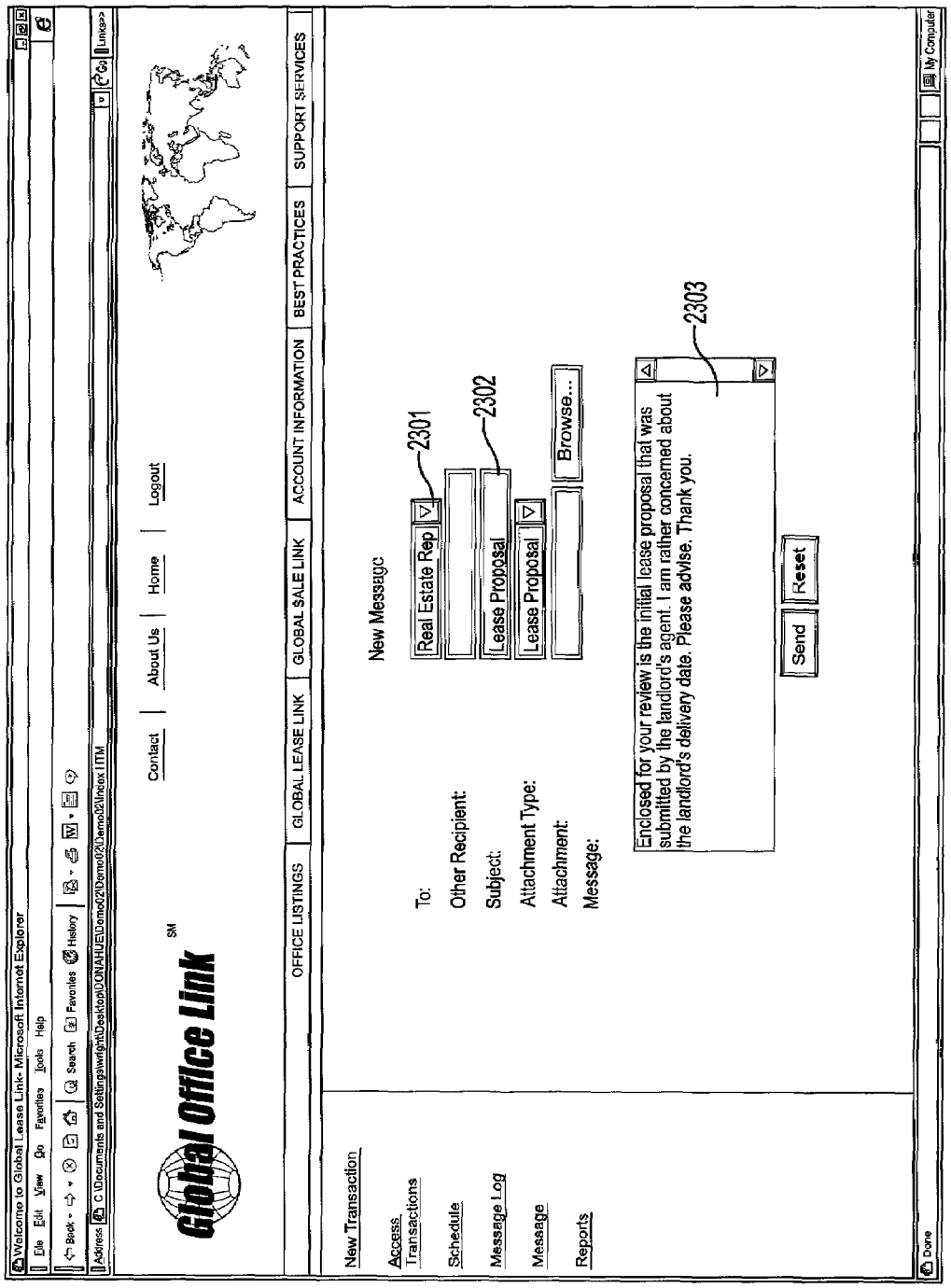
FIG. 23 shows a message transmission screen for sending messages to a person that plays a particular role in the lease negotiation process.

In one variation, messages can be sent to team members based on role, rather than contact name. Thus, for example, once a tenant has designated an architect to act on his or her behalf to handle one or more aspects of the lease negotiation, the report refers to the contact person by function rather than by user name, and others in the system can send a message to the person having that role merely by indicating that person's role. Turning to FIG. 23, for example, the messaging system includes a recipient field 2301 including a pull-down menu with choices corresponding to those roles that have been registered with the system. For example, a user can send a message to the architect or real estate representative by selecting one of those roles without remembering the person's name or system contact details, and the system will correlate that role with one or more specific e-mail addresses based on previous registrations within the system. In another variation, a real estate broker could send an e-mail to all architects (including those acting on behalf of the tenant and the landlord) by selecting "architect" as the recipient. The system would look up all persons having the role "architect" for the particular transaction and send the e-mail message to all such persons.

FIG. 24 shows another variation of a summary report, breaking out various information (including schedule information and current contact persons) for each phase of a transaction. This report can be retrieved by selecting details button 2102 in FIG. 21. The report shown in FIG. 21 includes different contacts for each phase of the lease negotiation, with hyperlinks to each allowing messages to be sent to them.

4. Dual Messaging System

Yet another improvement relates to a feature wherein a user can elect to send a message that is not posted in a message log visible to all members of the transaction team. FIG. 25 shows a message log showing messages that have been sent to parties negotiating a real estate transaction. In one embodiment of the invention, messages transmitted among all parties (including delegated participants) are recorded in such a message log. This message log allows all users to view messages and attachments that have been transmitted among the participants.

Sometimes, however, it may be desirable to send a message to one person in the group of people negotiating the contract without allowing others to view the message. According to one aspect of the invention, the sender of a message can indicate, such as by specifying a private designator 2206 (see FIG. 22), that the message should not be posted to the message log viewable by other transaction team members. The computer-implemented system of the present invention inhibits the posting of such messages to the message log, such that they do not appear in the display of FIG. 25. These messages would be transmitted instead to a separate mailbox for viewing only by each recipient.

The messaging and reporting systems are designed to generally facilitate communication and relay information during a transaction. However, most of this contact will be within each transaction team rather than between the two teams. It is contemplated that most of the contact between the two transaction parties would take place through the detailed screens, allowing of course for other means of communication. Accordingly, in one variation there can be two separate reports with respective contact persons for each party. For the dual messaging system, the system would function the same way: both parties would have his or her own message log, which would not preclude messages passing and being logged between parties. All messages within each team would be displayed, unless a team member opted to send a private message. Messages between teams would follow the same rules.

5. Customized Negotiation Process

The structured lease negotiation process as described herein is generally contemplated to cover transactions applicable to a wide variety of tenants, landlords, and others. It may be desirable, however, to permit parties to customize the negotiation process for a particular situation. For example, the process can be simplified by removing decisions that are not required by the parties to complete a transaction. Two different methods can be employed to accomplish this result.

In a first variation, a "customize lease" function is provided, allowing the party originating the transaction at the beginning of the process to click through a number of pre-formatted boxes to decide whether all of the standard decisions under Phase I (Agree Lease Proposal and Confirm Schedule) are applicable or non-applicable. For example, if there would be no "landlord's works" in the leased premises, this display screen and connected lower-level display screens related to specifying the landlord's works would be removed. Further, any related screens that would normally appear in subsequent phases of the process (e.g., completion of landlord's works) would also be removed. The other party not responsible for this customization process would be able to challenge any decisions deemed non-applicable, and the parties could agree to reinstate these decisions. In one variation, the "customize lease" function could be applied directly to all aspects of the process and not just to Phase I (this would primarily influence tenant-only decisions in Phase IV and VIII where the tenant is specifying and then completing its own works in conjunction with its own local service provider or project manager).

In a second variation, under the "Checklist" functions displayed in Phase III and IV, the parties may at specified intervals (e.g., defining landlord's works and tenant environment) agree to eliminate decisions that are not part of a negotiation, or are the tenant's responsibility under the lease, or which the tenant does not wish to address through this system. For example, if the tenant is providing the network system, this decision can be removed from landlord's works. The checklists also permit the parties to reconsider other aspects of the transaction as the negotiations continue and the roles and responsibilities become clear, and permit the tenant to re-evaluate its needs for improvements in the premises in those phases that do not involve the landlord. This would include, for example, restoring decisions that had been eliminated as part of the initial customization process.

These customization methods assure the parties that they will not expend unnecessary effort on screens and decisions that are irrelevant, and that corporate real estate representatives are not drawn into decision making for which they are not responsible and/or which the company would administer outside of the system. This also eliminates "downstream" decisions that would otherwise be redundant and permits the parties to adjust the decision making process as agreements are reached and new information becomes available.

It should also be apparent that customization can be based on broader user-specific needs, including for example different phases; different screen formats; milestone decisions; documentation and report interfaces; and messaging interfaces.

6. Sale-specific Features

Although the principles of the invention have been described primarily using the example of a real estate lease transaction, the invention can also be tailored to address a real estate sale transaction. This variation employs the above-described phased negotiation system including agreement/deferral decision-making processes, but with additional features that facilitate a sale transaction. The term "buyer" and "seller" in this variation should be understood to include agents acting on behalf of a buyer and seller respectively. Similarly, references in the figures and above description to "tenant," "landlord," and "lease" should be understood to refer to "buyer," "seller," and "sale" in the context of this variation of the invention.

FIG. 26 shows a computer display screen depicting a nine-phase negotiation process for consummating a real estate sale between a buyer and a seller. The negotiation process is divided into nine phases, although of course the number of phases and the contents of each phase can be rearranged or varied without departing from the inventive principles. As shown by way of example in FIG. 26, the phases include the following:

(1) confirm business terms and schedule
(2) resolve outstanding business issues
(3) agree on seller's deliverables and buyer's conditions
(4) finalize purchase and sale document
(5) obtain approvals and sign contract
(6) complete buyer's due diligence
(7) complete seller's works and deliverables
(8) complete transaction and closing
(9) issue best practice report As shown in FIG. 26, in one variation each phase is presented on a web page with an associated hyperlink (indicated by underlining in FIG. 26), such that each party to the negotiation can select a phase in order to proceed to making decisions regarding that phase. A field 2601 is provided to allow each user to enter a project or transaction number corresponding to a previously-started project or transaction, and the computer-assisted process retrieves from a file or database information relating to the previously-started transaction.

FIG. 27 shows a web page corresponding to user selection of the first phase (i.e., confirm sale proposal or business terms and schedule). The user is presented in FIG. 27 with a series of decisions 2701 through 2709 that are to be made in the course of negotiating a sale proposal and schedule. In particular, the parties are each asked to either agree or defer (indicated by choices 2712 and 2711) on each decision, including decisions regarding a sale price (decision 2701); disposition of assets (2702); structure of the transaction (2703); payment terms (2704); other conditions to sale (2705); deposit (2706); closing date (2707); schedule (2708); and sale proposal (2709). In one variation, clicking on a decision results in presentation of a help screen to the user that provides an explanation of the decision and how it can be made or deferred until a later phase.

Figure 28:
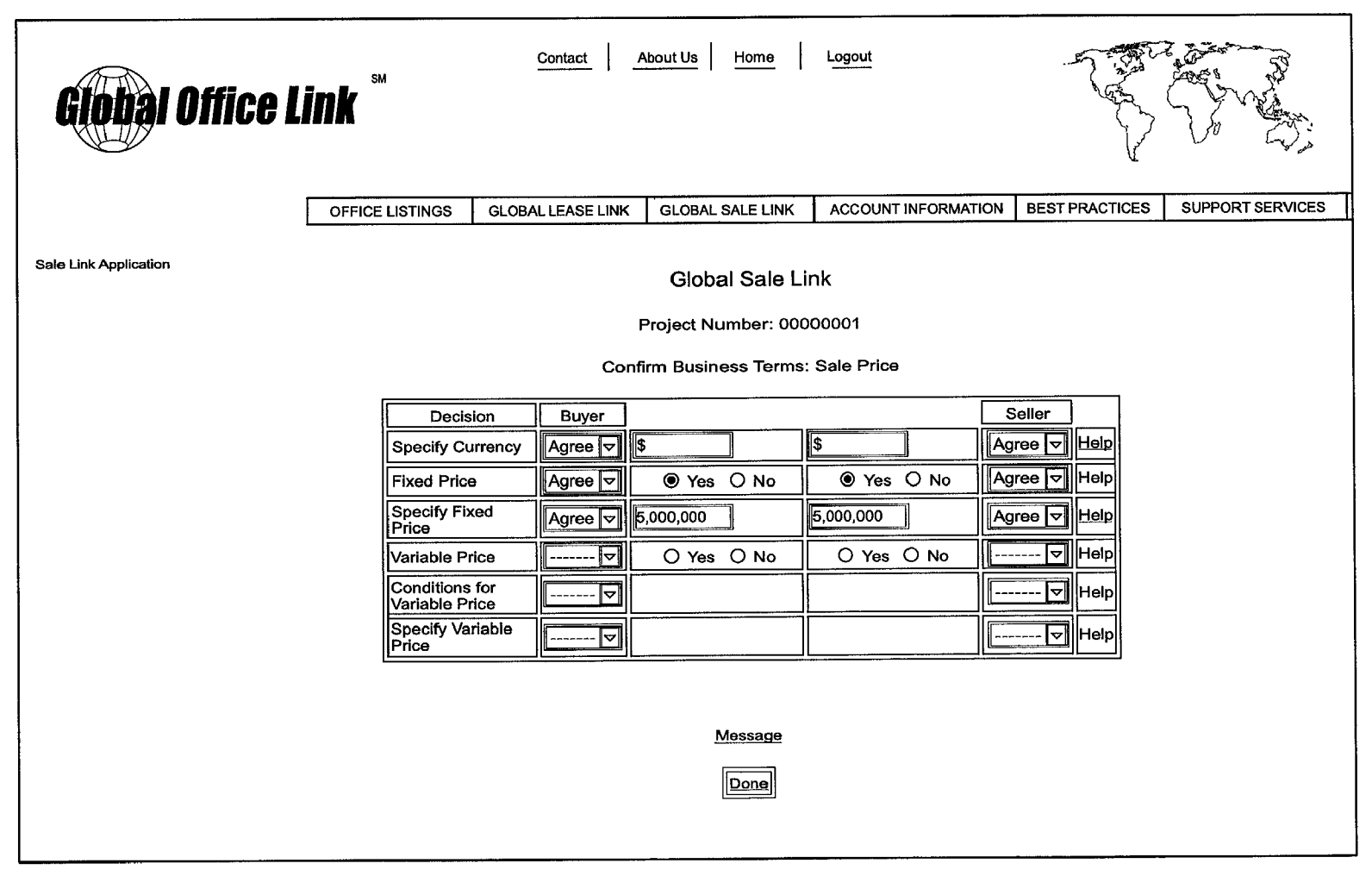

Additionally, by clicking on a details link 2713, the user is transferred to web page (e.g., FIG. 28) that contains additional details of the decision pertaining to the link. For example, as seen in FIG. 28, each user is invited to agree on a currency, fixed or variable price, conditions for variable price, and other parameters. As before, the buyer and the seller can each select either agree or defer for each decision. If both parties agree on a particular decision, that decision becomes "locked-in" in the computer for the remainder of the negotiation process, whereas a party selecting deferral of a decision causes the decision to be deferred to a later phase, where it can be revisited. For certain decisions, a free-form text/dialogue box can be provided for the parties to enter text describing the substance of the agreed decision. For example, for the decision relating to description of assets (element 2702), the users can be provided with a text box into which one of the parties enters a detailed description of the real estate property. For other decisions, parameterized fields can be provided for such quantifiable terms as sale price, closing date, and the like. In a slightly different variation, the dialogue boxes shown in FIG. 28 can be implemented like those shown in FIG. 13A, and other variations are of course possible without departing from the inventive principles.

Returning to FIG. 27, decision 2702 may include terms relating to specification of buildings; land; building improvements; leased properties; acquired properties; and other elements.

Decision 2703 may include terms relating to direct sale of assets; direct transfer of a leasehold interest; sale of a company; sale of a partnership or similar entity; and allocation of ownership interests.

Decision 2704 may include terms relating to payment in cash; payment in shares; and payment in installments.

Decision 2705 may include terms relating to condition of assets; legal documentation; mortgage financing; obtaining permits/approvals; and requiring local service provider (LSP) intervention.

Decision 2706 may include terms relating to contingent deposits; timing of payment; and specifying currency.

Decision 2707 may include terms relating to fixed or variable closing dates, among others.

Decision 2708 may include terms relating to binding or non-binding schedules; requiring LSP intervention; and a draft schedule.

Decision 2709 may include terms relating to binding or non-binding letters of intent; requiring LSP intervention; and agreement on a draft letter of intent.

Figure 37:
FIG. 37 shows a draft proposal for a sale of assets or property.

Also as shown in FIG. 27, an option 2710 is provided for viewing a draft sale proposal. When selected by a buyer or seller, a draft sale proposal such as that shown in FIG. 37 is presented, populated with information related to the presently-agreed sale terms.

FIG. 29 shows decisions pertaining to a second phase of a sale negotiation (resolve outstanding business issues). In this phase, the parties are invited to resolve outstanding business issues, such as payment terms. The parties may agree on a resolution method; select a local service provider (e.g., an appraiser or attorney); resolve an issue with the LSP; resolve without an LSP; and agree on summary documents. In one variation of the invention, the parties are prevented from proceeding to the next phase of negotiation until all outstanding business issues have been resolved. In another variation, the parties may defer certain decisions to later phases.

FIG. 30 shows a web-based computer screen corresponding to a third phase of the sale negotiation process (agree on seller's deliverables and buyer's conditions). In this phase, the parties are invited to agree on or defer decisions involving terms such as deliverables, due diligence conditions, and others.

FIG. 31 shows a web-based computer screen corresponding to a fourth phase of the sale negotiation process (agree on purchase and sale contract). In this phase, the parties are invited to agree on or defer decisions involving terms such as local service providers, draft contracts, and additional documents.

Figure 32:
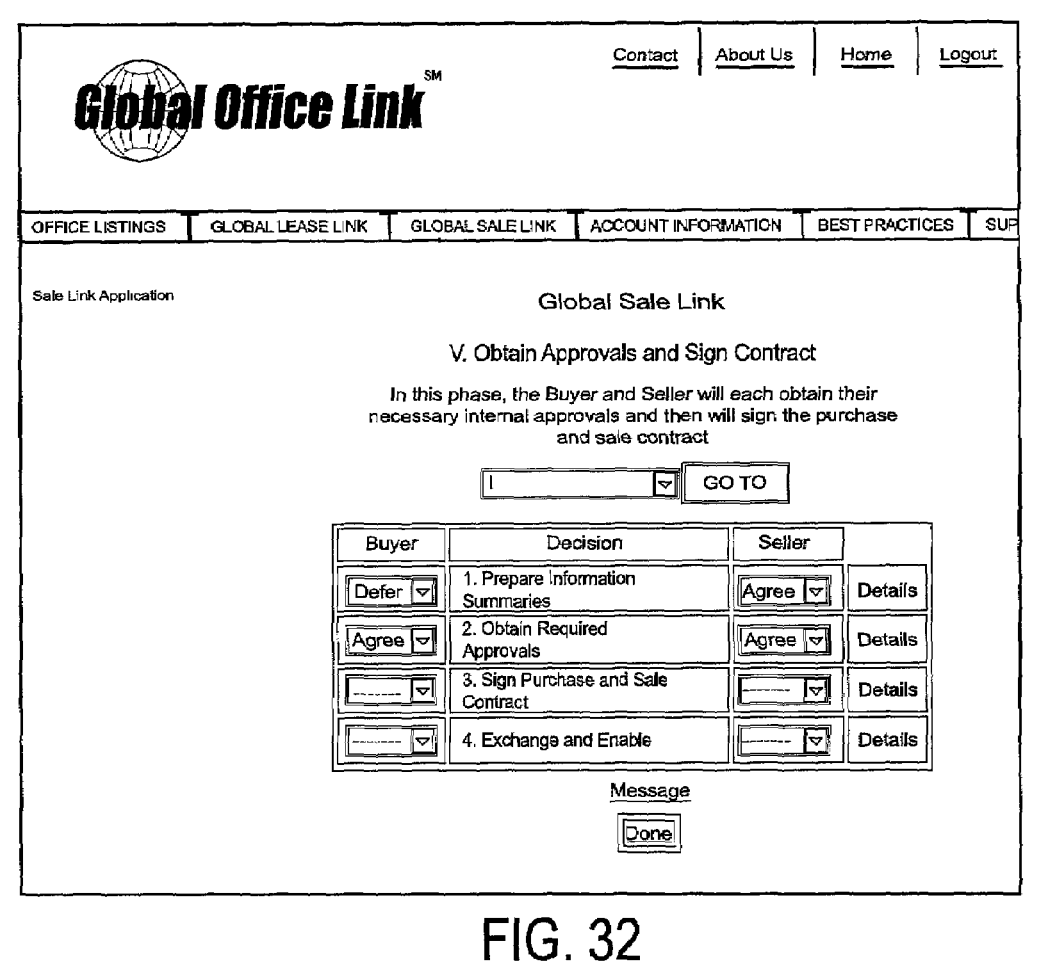

FIG. 32 shows a web-based computer screen corresponding to a fifth phase of the sale negotiation process (obtain approvals and sign contract), including options for agreeing on or deferring decisions relating to terms associated with this phase.

FIG. 33 shows a web-based computer screen corresponding to a sixth phase of the sale negotiation process (complete buyer's due diligence), including options for agreeing on or deferring decisions relating to terms associated with this phase.

Figure 34:
FIG. 34 shows various decisions that can be made during a seventh phase of a sale negotiation.

FIG. 34 shows a web-based computer screen corresponding to a seventh phase of the sale negotiation process (complete seller's works and deliverables), including options for agreeing on or deferring decisions relating to terms associated with this phase.

FIG. 35 shows a web-based computer screen corresponding to an eighth phase of the sale negotiation process (complete transaction and closing), including options for agreeing on or deferring decisions relating to terms associated with this phase.

FIG. 36 shows a web-based computer screen corresponding to a ninth phase of the sale negotiation process (issue best practice report), including options for agreeing on or deferring decisions relating to terms associated with this phase.

Thus has been described a system and method for negotiating a contract, such as a real estate transaction, using a computer network. The invention has broad applicability and scope beyond real estate transactions, and can be applied more generally in any contract negotiation setting, such as a corporate procurement contract or a contract related to supply-chain management applications. The inventive principles can be practiced using an intranet, extranet, wireless network, 3G systems using GSM and other technologies.

Reference numerals in the appended method claims identifying steps are for convenience only and are not intended to imply a necessary ordering of the steps. It is, therefore, to be understood that within the scope of the appended claims the invention may be practiced otherwise than as specifically described. No claim should be interpreted to be in means-plus-function format.

The invention claimed is:

1. A computer-assisted method of negotiating a contract over a computer network between a first negotiator and a second negotiator, comprising the steps of:
   (1) displaying on a first computer screen a plurality of predefined contract provisions, each relating to a contract provision and including an agree/defer selector for the first negotiator; a first dialogue box into which the first negotiator can enter text; an agree/defer selector for the second negotiator; and a second dialogue box into which the second negotiator can enter text;
   (2) receiving for each of the plurality of predefined contract provisions an agree/defer selection from the first negotiator;
   (3) displaying on a second computer screen the plurality of predefined contract provisions, including any agree/defer selections made by the first negotiator; the first dialogue box; the agree/defer selector for the second negotiator, and the second dialog box;
   (4) receiving for each of the plurality of predefined contract provisions an agree/defer selection from the second negotiator;
   (5) storing the agree/defer selections made by the first and second negotiators in a computer memory;
   (6) in response to detecting that the first and second negotiators have entered identical text in each respective first and second dialogue boxes, permitting the second negotiator to select "agree" and otherwise inhibiting such selection; and
   (7) repeating steps (1) and (3) until the first and second negotiator have selected either agree or defer for each of the plurality of contract provisions.

2. The computer-assisted method of claim 1, further comprising the step of preventing the first negotiator from entering text into the second dialogue box.

3. The computer-assisted method of claim 1, further comprising the step of, in steps (1) and (2), displaying a first response box into which the first negotiator can enter text, and a second response box into which the second negotiator can enter text, the method further comprising the step of:
   in response to detecting that the first and second negotiators have entered identical text in each respective first and second response box, permitting the first and second negotiators to select "agree" for the agree/defer selector, and otherwise inhibiting such selection.

4. The computer-assisted method of claim 1, further comprising the step of:
   (a) in response to detecting that the second negotiator has entered text in the second dialogue box, determining whether the first negotiator has indicated acceptance of the text in the second dialogue box and, in response to such acceptance, permitting the first negotiator to select an "agree" selector, and otherwise inhibiting such selection.

5. The computer-assisted method of claim 4, further comprising the step of:
   (b) in response to detecting that the first negotiator has entered text in the first dialogue box, determining whether the second negotiator has indicated acceptance of the text in the first dialogue box and, in response to such acceptance, permitting the first negotiator to select an "agree" selector, and otherwise inhibiting such selection.

6. The computer-assisted method of claim 5, wherein steps (a) and (b) comprise the step of determining whether each respective negotiator has entered text into a response box.

7. The computer-assisted method of claim 1, further comprising the step of:
   in response to detecting that the first and second negotiators have entered different text in each respective first and second dialogue box for a particular contract provision, generating a message highlighting a discrepancy with respect to that particular contract provision.

8. The method of claim 1, further comprising:
   (a) repeating steps (1) through (5) for a plurality of different transactions; and
   (b) generating a summary report that includes, for each of the plurality of different transactions, information identifying the contract and a current contact person for each respective transaction, and, in response to selecting one of the current contact persons, generating a message to the one current contact person.

9. The computer-assisted method of claim 8, wherein step (b) comprises the step of including on the summary report a current contact person that has been authorized to act on behalf of one of the negotiators.

10. The computer-assisted method of claim 8, wherein step (b) comprises the step of including on the summary report a current contact person that is identified by a role played in negotiating the transactions.

11. The computer-assisted method of claim 10, wherein step (b) comprises the step of displaying a menu of choices including a plurality of current contacts identified by respective roles played in negotiating the transaction.

12. The computer-assisted method of claim 8, further comprising the step of generating a second summary report that includes, for one of the plurality of different transactions, a plurality of phases into which the one transaction has been partitioned, and displaying different current contact persons for at least two of the plurality of phases.

13. The computer-assisted method of claim 8, wherein step (b) comprises the step of generating a summary report that includes the information identifying each transaction on a single line of a multi-line tabular display format.

14. The method of claim 1, further comprising:
   providing a dual-messaging function that permits members of a transaction team authorized to act on behalf of one of the negotiators to transmit messages to other members of the transaction team that are recorded in a message log that can be viewed by all members of the transaction team, and permits members of the transaction team to selectively transmit messages to other members of the transaction team that are not recorded in the message log, such that they cannot be viewed by all members of the transaction team.

15. The method of claim 1, further comprising:
   providing a customization function that permits one of the negotiators to, prior to step (1), selectively exclude one or more of the predetermined agreement provisions from being displayed in steps (1) and (3).

16. The method of claim 1, further comprising:
   negotiating between the first and second negotiators to reach agreement on at least one of the provisions for which the first and second negotiators did not reach agreement;
   receiving from each party an evaluation form including information relating to the sale negotiation process; and
   generating a report including information received from the evaluation form.

17. The computer-assisted method of claim 1, wherein the contract relates to a real estate transaction.

* * * * *